(12) United States Patent
Harada et al.

(10) Patent No.: US 11,671,889 B2
(45) Date of Patent: Jun. 6, 2023

(54) USER TERMINAL

(71) Applicant: NTT DOCOMO, INC., Tokyo (JP)

(72) Inventors: Hiroki Harada, Tokyo (JP); Hideaki Takahashi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/042,549

(22) PCT Filed: Mar. 30, 2018

(86) PCT No.: PCT/JP2018/013951
§ 371 (c)(1),
(2) Date: Sep. 28, 2020

(87) PCT Pub. No.: WO2019/187145
PCT Pub. Date: Oct. 3, 2019

(65) Prior Publication Data
US 2021/0037439 A1    Feb. 4, 2021

(51) Int. Cl.
*H04W 36/08* (2009.01)
*H04W 36/30* (2009.01)
*H04W 56/00* (2009.01)
*H04W 88/02* (2009.01)

(52) U.S. Cl.
CPC ........... *H04W 36/08* (2013.01); *H04W 36/30* (2013.01); *H04W 56/001* (2013.01); *H04W 88/02* (2013.01)

(58) Field of Classification Search
CPC .... H04W 36/08; H04W 36/30; H04W 56/001
USPC ........................................................ 455/436
See application file for complete search history.

(56) References Cited

U.S. PATENT DOCUMENTS

| 2012/0082070 A1* | 4/2012 | Hart ..................... H04J 11/0023 370/280 |
| 2015/0087296 A1* | 3/2015 | Kim .................. H04W 72/0473 455/422.1 |
| 2015/0264671 A1 | 9/2015 | Maeda et al. |
| 2017/0208516 A1 | 7/2017 | Kubota et al. |

(Continued)

FOREIGN PATENT DOCUMENTS

| CN | 103124429 A | 5/2013 |
| JP | 2013-070409 A | 4/2013 |

(Continued)

OTHER PUBLICATIONS

3GPP TS 36.300 V8.12.0 "3rd Generation Partnership Project; Technical Specification Group Radio Access Network Evolved Universal Terrestrial Radio Access (E-UTRA) and Evolved Universal Terrestrial Radio Access Network (E-UTRAN); Overall description; Stage 2 (Release 8)" Mar. 2010 (149 pages).

(Continued)

*Primary Examiner* — Joel Ajayi
(74) *Attorney, Agent, or Firm* — Osha Bergman Watanabe & Burton LLP

(57) ABSTRACT

A user terminal according to one aspect of the present disclosure includes: a receiving section that receives measurement signals of a first cell and a second cell; and a control section that, when at least one of handover, cell re-selection and a cell addition procedure is performed based on a measurement result that uses the measurement signals, determines whether or not to assume that timings of radio frames and numbers assigned to the radio frames match between the first cell and the second cell.

7 Claims, 11 Drawing Sheets

(56) References Cited

U.S. PATENT DOCUMENTS

| | | | |
|---|---|---|---|
| 2018/0054699 A1* | 2/2018 | Edge | H04W 4/029 |
| 2018/0077635 A1 | 3/2018 | Kim et al. | |
| 2018/0234930 A1* | 8/2018 | Chen | H04W 72/005 |
| 2018/0262313 A1* | 9/2018 | Nam | H04W 72/0446 |

FOREIGN PATENT DOCUMENTS

| | | |
|---|---|---|
| JP | 2016-039581 A | 3/2016 |
| JP | 2017175662 A | 9/2017 |
| WO | 2017-127440 A1 | 7/2017 |

OTHER PUBLICATIONS

International Search Report issued in International Application No. PCT/JP2018/013951, dated Jun. 19, 2018 (5 pages).

Written Opinion issued in International Application No. PCT/JP2018/013951; dated Jun. 19, 2018 (5 pages).

Extended European Search Report issued in Application No. 18913004.0 dated Dec. 10, 2021 (9 pages).

Samsung, "NR mobility in connected-active mode" 3GPP TSG RAN WG1 #86bis, R1-1609121, Lisbon, Portugal, Oct. 10-14, 2016 (5 pages).

Notice of Reasons for Refusal issued in Japanese Application No. 2020-508909 dated May 24, 2022 (8 pages).

Intel Corporation, "Summary of Discussion for NR RRM measurements", 3GPP TSG RAN WG1 Meeting #92, R1-1803399, Athens, Greece, Feb. 26-Mar. 2, 2018 (16 pages).

ZTE Corporation Sanechips, "Clarification on SSB-ToMeasure bitmap in SMTC configuration", 3GPP TSG-RAN WG2 Meeting #101, R2-1802023, Athens, Greece, Feb. 26-Mar. 2, 2018 (5 pages).

NTT Docomo, "WF on gap for intra-frequency measurement", 3GPP TSG-RAN WG4 RAN#85, R4-1714288, Reno, US, Nov. 27-Dec. 1, 2017 (11 pages).

TSG RAN WG2, "Presentation of Specification TS 38.331, Verision 1.0.0", 3GPP TSG-RAN Meeting #77, RP-172570, Lisbon, Portugal, Dec. 18-21, 2017 (188 pages).

Office Action in counterpart Indian Patent Application No. 202037042934 dated Aug. 2, 2022 (6 pages).

* cited by examiner

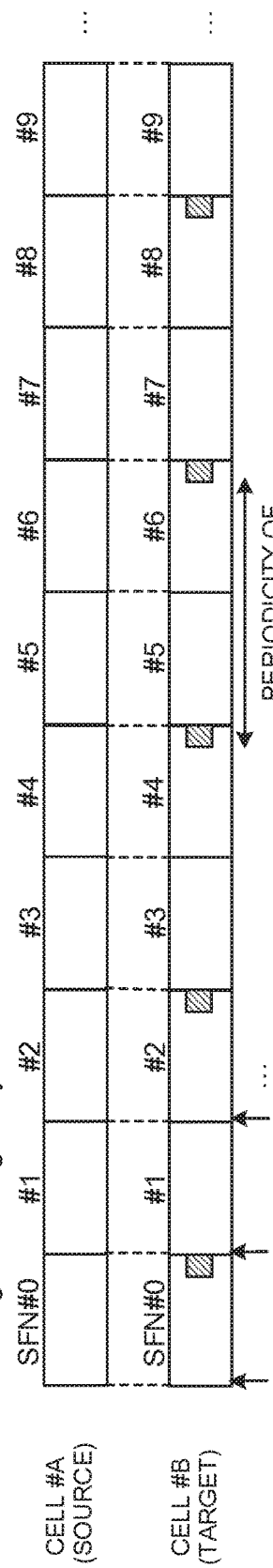
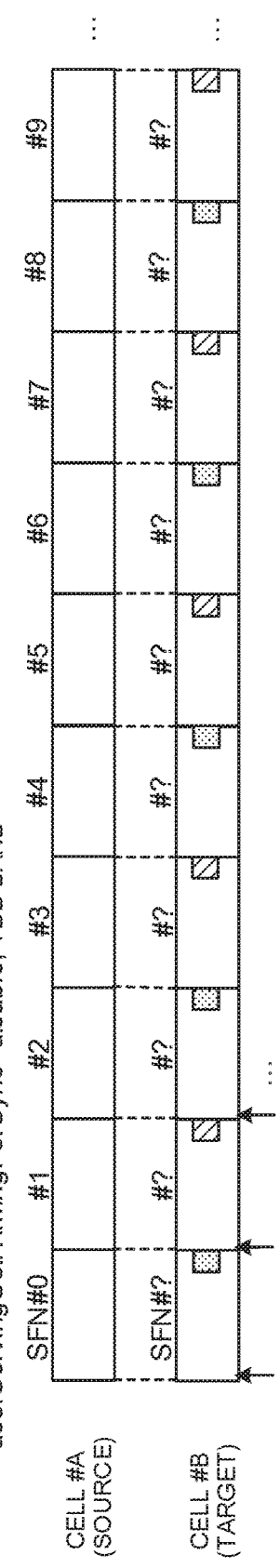
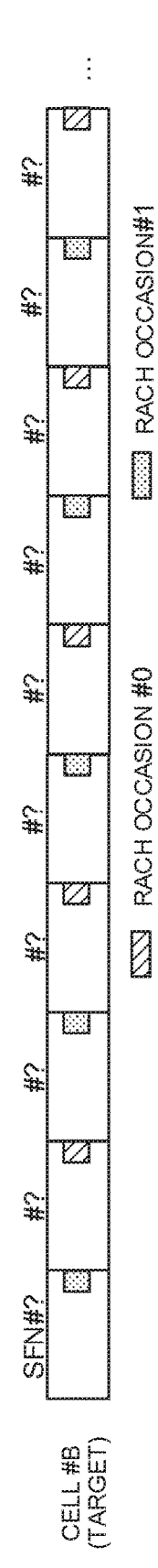

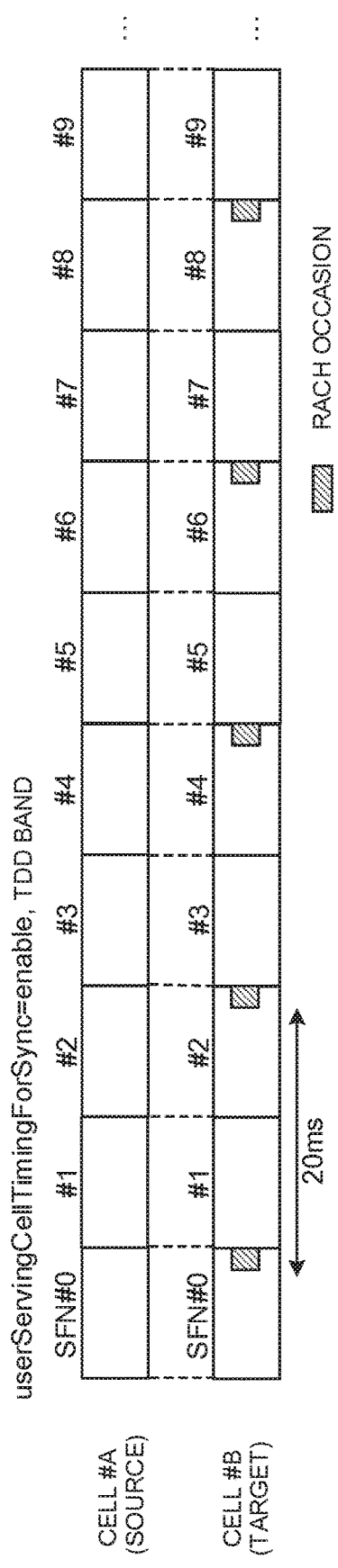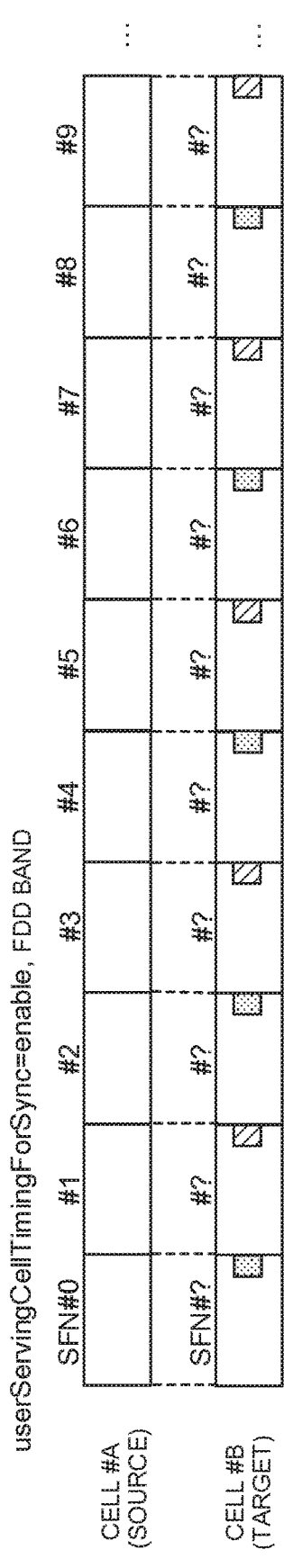

USER TERMINAL

TECHNICAL FIELD

The present disclosure relates to a user terminal of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1).

Furthermore, successor systems of LTE (3GPP Rel. 10 to 14) (also referred to as, for example, Future Radio Access (FRA), the 5th generation mobile communication system (5G), 5G+ (plus), New Radio (NR), New radio access (NX), Future generation radio access (FX) or 3GPP Rel. 15 or subsequent releases) are also studied.

Legacy LTE systems (e.g., LTE Rel. 8 to 14) specify a control procedure (e.g., handover and cell re-selection) of mobility of a user terminal (UE: User Equipment).

According to handover, when the user terminal is in a connected state (RRC_CONNECTED), a network (e.g., a radio base station (eNB: eNodeB)) takes a lead in switching a serving cell based on a measurement result of the serving cell and neighbor cells. The serving cell may be a cell that the user terminal is currently connected with. The neighbor cells may be cells that are connection candidates of the user terminal.

On the other hand, according to cell re-selection, when the user terminal is in an idle state (RRC_IDLE), the user terminal takes a lead in changing a camped cell. The camped cell may be a cell in which the user terminal resides.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

It is studied that future radio communication systems (also referred to as, for example, 3GPP Rel. 15 and subsequent releases, NR, 5G and 5G+) also perform, for example, the above-described handover and cell re-selection to control mobility of a user terminal.

However, when the future radio communication systems perform a control procedure (e.g., at least one of the above-described handover and cell re-selection) of the mobility of the user terminal, there is a risk that a problem of a latency time becomes significant. Furthermore, when a cell addition procedure (e.g., an addition procedure of a Secondary Cell (SCell) according to at least one of Carrier Aggregation (CA) and Dual Connectivity (DC), an addition procedure of a Primary Secondary Cell (PSCell) according to DC, and addition of the SCell of a different Timing Advance Group (TAG)) is performed, too, there is a risk that a problem of a latency time becomes significant. Thus, it is preferred that the future radio communication systems suppress an increase in a latency time in various procedures (e.g., the above mobility procedure and cell addition procedure) performed by the user terminal.

The present invention has been made in light of this point, and one of objects of the present invention is to provide a user terminal that can suppress an increase in a latency time in various procedures (e.g., at least one of a mobility control procedure and a cell addition procedure) performed by a user terminal.

Solution to Problem

A user terminal according to one aspect of the present invention includes: a receiving section that receives measurement signals of a first cell and a second cell; and a control section that, when at least one of handover, cell re-selection and a cell addition procedure is performed based on a measurement result that uses the measurement signals, determines whether or not to assume that timings of radio frames and numbers assigned to the radio frames match between the first cell and the second cell.

Advantageous Effects of Invention

According to the present invention, it is possible to suppress an increase in a latency time in various procedures (e.g., at least one of a mobility control procedure and a cell addition procedure) performed by a user terminal.

BRIEF DESCRIPTION OF DRAWINGS

FIGS. 3A to 3C are diagrams illustrating a second assumption example related to inter-cell synchronization according to the first aspect.

FIGS. 4A and 4B are diagrams illustrating a third assumption example related to inter-cell synchronization according to the first aspect.

DESCRIPTION OF EMBODIMENTS

Figure 1:
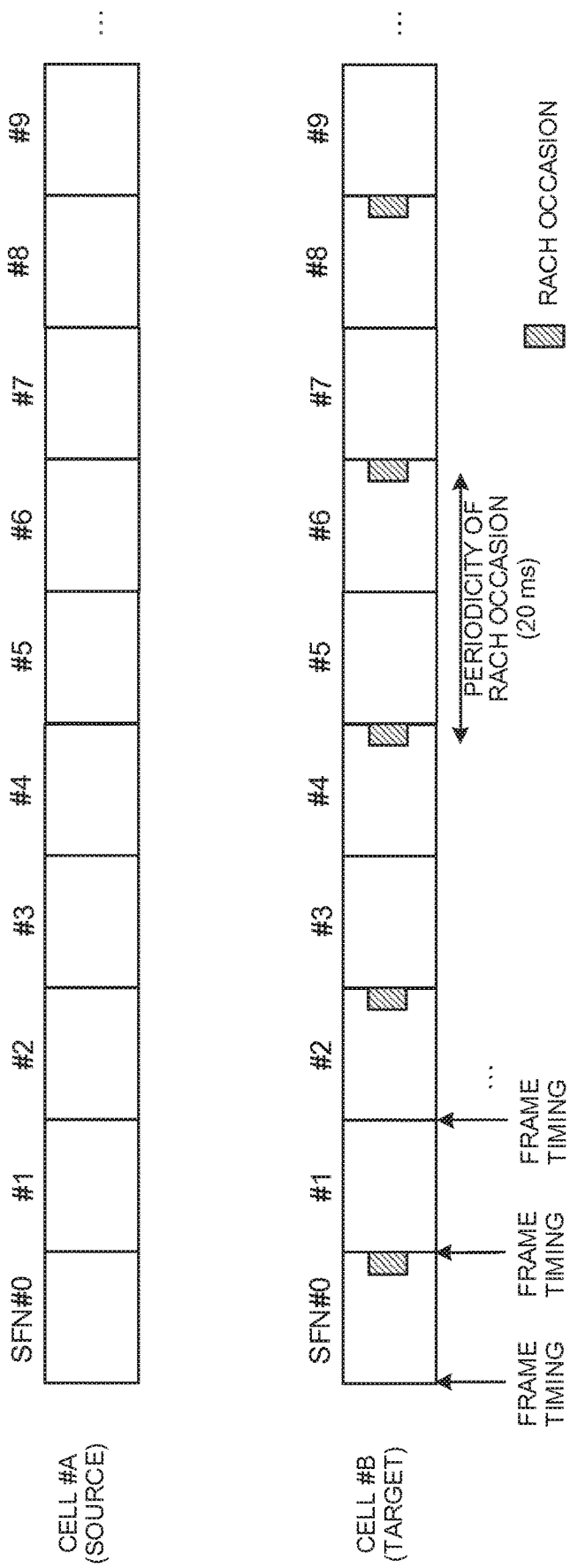
FIG. 1 is a diagram illustrating one example of RACH occasions.

In future radio communication systems (also referred to as, for example, 3GPP Rel. 15 and subsequent releases, NR, 5G and 5G+), a user terminal detects at least one of a boundary (also referred to as, for example, a timing or a frame timing) of each radio frame in a cell (also referred to as, for example, a serving cell, a neighbor cell, a carrier or a Component Carrier (CC)), and a number (also referred to as, for example, a System Frame Number (SFN) or an SFN number) assigned to each radio frame, and performs communication in the cell.

In this regard, the radio frame is a given time unit and may be, for example, 10 ms. The radio frame includes, for example, 10 subframes, and each subframe may be 1 ms. The number of OFDM symbols per subframe is determined based on the number of symbols per slot and the number of slots per subframe. Furthermore, the radio frame may include first half and second half frames (also referred to as half radio frames such as 5 ms).

The slot is a time unit that can vary according to a numerology (e.g., at least one of a subcarrier spacing and a symbol length). The number of OFDM symbols per slot may be, for example, 14. The number of slots in a radio frame changes according to the numerology. When, for example, the subcarrier spacings are 15, 30, 60, 120 or 240 kHz, the numbers of slots in the radio frame may be respectively 10, 20, 40, 80, 160 and 320.

The SFN is transmitted on a broadcast channel (PBCH: Physical Broadcast Channel) (is included in a PBCH payload). The PBCH payload may include at least one of an MIB and a transport block (PBCH transport block). For example, part of the SFN (e.g., 6 Most Significant Bits (MSBs) of the 10-bit SFN) may be included in the MIB, and the rest (e.g., 4 Least Significant Bits (LSBs)) may be included in the PBCH transport block.

The frame timing is derived based on an index of a Synchronization Signal Block (SSB) (SSB index) and an index of a half frame (half frame index). The half frame timing is derived based on an SSB index.

The SSB is a signal block including a synchronization signal (including at least one of an SS: Synchronization Signal, a PSS: Primary Synchronization Signal and an SSS: Secondary Synchronization Signal) and a PBCH, and may be referred to as an SS/PBCH block. The SSB may be multiplexed with a DeModulation Reference Signal (DMRS) of the PBCH.

An SSB index (also referred to as, for example, an SS/PBCH block index) may be associated with a resource position (e.g., a resource position in a time direction) of the SSB, and used as a time index. The SSB index may be determined based on at least one of information (PBCH payload) transmitted on the PBCH and a sequence pattern (DMRS pattern) of the DMRS of the PBCH.

In a case of, for example, a first frequency range (an FR1: Frequency Range 1 such as 6 GHz or less), the user terminal may determine the SSB index based on the above DMRS pattern. In a case of a second frequency range (an FR2 such as 24 GHz or more), the user terminal may determine 3 least significant bits of the SSB index based on the above DMRS pattern, and determine 3 most significant bits based on the PBCH payload.

The half frame index may be determined based on at least one of the PBCH payload and the DMRS pattern. In a case of, for example, a certain frequency range (that is, for example, equal to or less than (or less than) 3 GHz), the user terminal may determine the half frame index based on the above DMRS pattern. On the other hand, in a case of another frequency range (that is, for example, larger than (or equal to or more than) 3 GHz), the user terminal may determine the half frame index based on the PBCH payload.

Thus, to detect at least the SFN, the user terminal needs to decode the PBCH, and read the PBCH payload. Furthermore, there is also a case where, to detect at least one of the half frame timing and the frame timing, the user terminal needs to decode the PBCH, and read the PBCH payload (e.g., a case where the user terminal obtains the SSB index in the FR2 and a case where the user terminal obtains the half frame index at 3 GHz or more).

Furthermore, it is studied for the above future radio communication systems to enable a following synchronous operation and asynchronous operation.

A synchronous operation and an asynchronous operation (also referred to as, for example, inter-cell synchronization and inter-cell asynchronization) between a plurality of cells on an identical frequency A synchronous operation and an asynchronous operation (also referred to as, for example, inter-carrier synchronization and inter-carrier asynchronization) between a plurality of cells on different frequencies Following viewpoints (1) and (2) are assumed for at least one of inter-cell synchronization and inter-carrier synchronization (inter-cell/inter-carrier synchronization).

(1) Whether or not frame timings match (align) between a plurality of cells (2) Whether or not SFNs match (align) between a plurality of these cells It is also studied that, in a case of inter-cell/inter-carrier synchronization, the user terminal detects a specific signal (e.g., measurement signal) in a cell of a measurement target (measurement target cell) based on a timing (e.g., frame timing) of a serving cell that the user terminal is currently connected with or another cell of a frequency identical to that of the measurement target cell.

When, for example, a given field (e.g., useServingCell-TimingForSync) in configuration information (e.g., MeasObjectN) for intra-frequency measurement is effective, the user terminal may detect the SSB index of the measurement target cell based on the frame timing of the serving cell. In this case, the user terminal can obtain the SSB index without decoding the PBCH of the measurement target cell, and consequently can simplify an operation of detecting the specific signal of the measurement target cell.

By the way, a mobility control procedure of the user terminal in the above future radio communication systems may include at least one of handover and cell re-selection. Handover is processing where, when the user terminal is in a connected state (RRC_CONNECTED), a network (e.g., a radio base station (a gNB: gNodeB or an eNB)) takes a lead in switching a serving cell. Cell re-selection is processing where, when the user terminal is in an idle state (RRC_IDLE), the user terminal takes a lead in switching a camped cell.

Handover may include, for example, at least one of following procedures.

1. A handover source radio base station (also referred to as a source base station or a source cell) performs a handover preparation procedure between the handover source radio base station and a handover target radio base station (a target base station or a target cell) based on a measurement report result from the user terminal.

2. When finishing the preparation procedure between the source base station and the target base station, the source base station transmits a handover command to the user terminal. The handover command may include RRC connection reconfiguration (RRCConnectionReconfiguration) information.

3. The user terminal performs a random access procedure for the target base station based on the information included in the handover command.

To transmit a random access preamble (PRACH: Physical Random Access Channel) in the random access procedure for the target base station, the user terminal determines a PRACH transmission occasion (RACH occasion) of a given periodicity based on at least one of a half frame timing, a frame timing and an SFN of the target cell.

When, for example, the periodicity of the RACH occasion is 5 ms or less, the user terminal determines the RACH occasion based on the half frame timing of the target cell. To derive the half frame timing, an SSB index of the target cell is necessary.

Furthermore, when the periodicity of the RACH occasion is longer than 5 ms and is 10 ms or less, the user terminal determines the RACH occasion based on the frame timing of the target cell. To derive the frame timing, a half frame index is necessary in addition to the SSB index of the target cell.

Furthermore, when the periodicity of the RACH occasion is longer than 10 ms, the user terminal determines the RACH occasion based on at least part of the frame timing and the SFN of the target cell. As described above, the SFN is included in the PBCH payload, and therefore it is necessary to decode the PBCH payload of the target cell to derive the SFN.

FIG. 1 is a diagram illustrating one example of RACH occasions. FIG. 1 illustrates one example where a periodicity of the RACH occasion is 20 ms. Furthermore, FIG. 1 illustrates a case where a radio frame in which the RACH occasion is provided includes an SFN of mod(SFN/2)=0. In addition, FIG. 1 is only exemplary, and radio frames in which the RACH occasions are provided and positions of the RACH occasions in the radio frames are not limited to those illustrated in FIG. 1.

When the periodicity of the RACH occasion of a target cell #B is longer than 1 radio frame (10 ms) as illustrated in FIG. 1, it is necessary to decode a PBCH of the target cell #B and derive an SFN of the target cell #B to determine in which radio frames the RACH occasions are provided.

In this case, there is a risk that a latency time due to handover becomes great, and influences an allowance time of latency due to handover. For example, it is assumed that a transmission periodicity of the SSB the number of samples for decoding of the PBCH needs to be considered to specify the allowance time. In addition, it is assumed that similar consideration is necessary to specify a latency time due to measurement.

In this regard, when the source cell #A and the target cell #B are cells of an identical frequency, and in a case of a frequency range of Time Division Duplex (TDD) (TDD band) in FIG. 1, if above useServingCellTimingForSync is enabled, it is possible to assume that timings (e.g., at least one of the frame timings and the half frame timings) match between the source cell #A and the target cell #B. In this case, when it is possible to assume that the SFNs match between the source cell #A and the target cell #B, even if the periodicity of the RACH occasion is longer than 10 ms, it is unnecessary to decode the PBCH.

However, whether or not it is possible to assume that the SFNs match between the source cell #A and the target cell #B (i.e., whether or not it is necessary to decode the PBCH) is not determined yet for the future radio communication systems. Hence, implementing the user terminal to decode the PBCH of the target cell #B just in case in preparation for a case where the SFN is necessary to detect the RACH occasion (e.g., a case where the periodicity of the RACH occasion is longer than 10 ms) causes a risk that a latency time increases.

Furthermore, when the source cell #A and the target cell #B are cells of an identical frequency, and in a case of a frequency range of Frequency Division Duplex (FDD) (FDD band) in FIG. 1, there is a risk that the user terminal cannot recognize a synchronous operation of the source cell #A and the target cell #B. Hence, implementing the user terminal to decode the PBCH of the target cell #B just in case in preparation for a case where the SFN is necessary to detect the RACH occasion (e.g., a case where the periodicity of the RACH occasion is longer than 10 ms) causes a risk that a latency time increases.

There is a risk that this problem occurs in the mobility control procedure of the user terminal such as not only handover but also cell re-selection, too. Furthermore, it is assumed that the user terminal transmits a PRACH in a cell of an addition target (addition target cell) in, for example, the addition procedure of a cell (e.g., an SCell, a PSCell or a UL SCell of a different TAG). Therefore, there is a risk that the same problem occurs. Therefore, it is preferred to make it clear whether or not it is possible to assume that frame timings and SFNs match between an observation target cell (e.g., a target cell, a camping candidate cell or a measurement target cell) and a serving cell (e.g., a source cell or a camped cell) in the mobility control procedure (e.g., at least one of handover and cell re-selection). Furthermore, it is preferred to make it clear whether or not it is possible to assume that the frame timings and the SFNs match between the additional target cell and the serving cell (e.g., the Primary Cell (PCell) or the SCell) in the cell addition procedure, too.

Hence, the inventors of the present invention have conceived making it possible to determine whether or not to assume that frame timings and SFNs match between cells in various procedures (e.g., at least one of the mobility control procedure and the cell addition procedure) performed by the user terminal, and thereby suppressing an increase in a latency time of the control procedure.

The present embodiment will be described in detail below with reference to the drawings. In addition, handover (first aspect) and cell re-selection (second aspect) will be exemplified below as the mobility control procedure. However, the present embodiment is not limited to these. For example, at least one of following assumption examples is applicable to intra-frequency measurement for measuring a serving cell and neighbor cells of an identical cell, and the cell addition procedure, too. Furthermore, inter-cell synchronization will be described below. However, the present embodiment is applicable to inter-carrier synchronization, too, as appropriate.

(First Aspect)

The first aspect will describe determination on whether or not to assume that frame timings and SFNs match (align) between cells when handover is performed.

According to the first aspect, a user terminal receives measurement signals of a plurality of cells (e.g., a first cell (also referred to as, for example, a serving cell, a Handover (HO) source cell or a source cell) and a second cell (also referred to as, for example, a neighbor cell, an HO target cell or a target cell)), and performs measurement by using the measurement signals.

In this regard, the measurement signal may be at least one of, for example, an SSB and a Channel State Information-Reference Signal (CSI-RS).

A source base station receives a measurement report including a result of the above measurement from the user terminal. The source base station determines HO for the target cell based on the result of the above measurement, and performs a handover preparation procedure between the source base station and a target base station. The source base station transmits information (handover information) related to handover from the source cell to the target cell to the user terminal.

The handover information may be referred to as, for example, a handover command or an RRC reconfiguration message. The handover information may include at least one of a cell ID, information requested to access the target cell and the RRC reconfiguration information (e.g., radio bearer configuration information or information related to measurement).

Furthermore, a given field (e.g., useServingCellTimingForSync) in the RRC reconfiguration information may indicate whether or not it is possible to derive an SSB index of a neighbor cell based on a timing (e.g., frame timing) of the serving cell. When, for example, useServingCellTimingForSync is true (enabled), the given field may indicate that the SSB index can be derived. When useServingCellTimingForSync is false (disabled), the given field may indicate that the SSB index cannot be derived. Whether useServingCellTimingForSync is enabled or disabled may be indicated by a value of useServingCellTimingForSync, or may be indicated by the presence of useServingCellTimingForSync.

When receiving useServingCellTimingForSync, the user terminal may derive the SSB index of the neighbor cell of the target cell based on the timing of the target cell, and perform intra-frequency measurement on the neighbor cell based on the SSB index.

When receiving the handover information, the user terminal may determine (control) whether or not to assume that frame timings (timings of radio frames) and SFNs (numbers assigned to the radio frames) match between the source cell and the target cell. More specifically, the user terminal can use following first to fourth assumption examples.

First Assumption Example

In the first assumption example, the user terminal may determine whether or not to assume (whether or not it is possible to assume) that frame timings and SFNs match (synchronize) between a plurality of cells based on a frequency range.

More specifically, in a case of a TDD band, the user terminal can assume that frame timings and SFNs of a serving cell and all neighbor cells match. For example, in a case of the TDD band, the user terminal may assume that frame timings and SFNs match between a source cell and a target cell during handover from the serving cell (source cell) to a neighbor cell (target cell) of the serving cell.

On the other hand, in a case of an FDD band, it is not assumed that the frame timings and the SFNs of the serving cell and all neighbor cells match.

Figure 2:
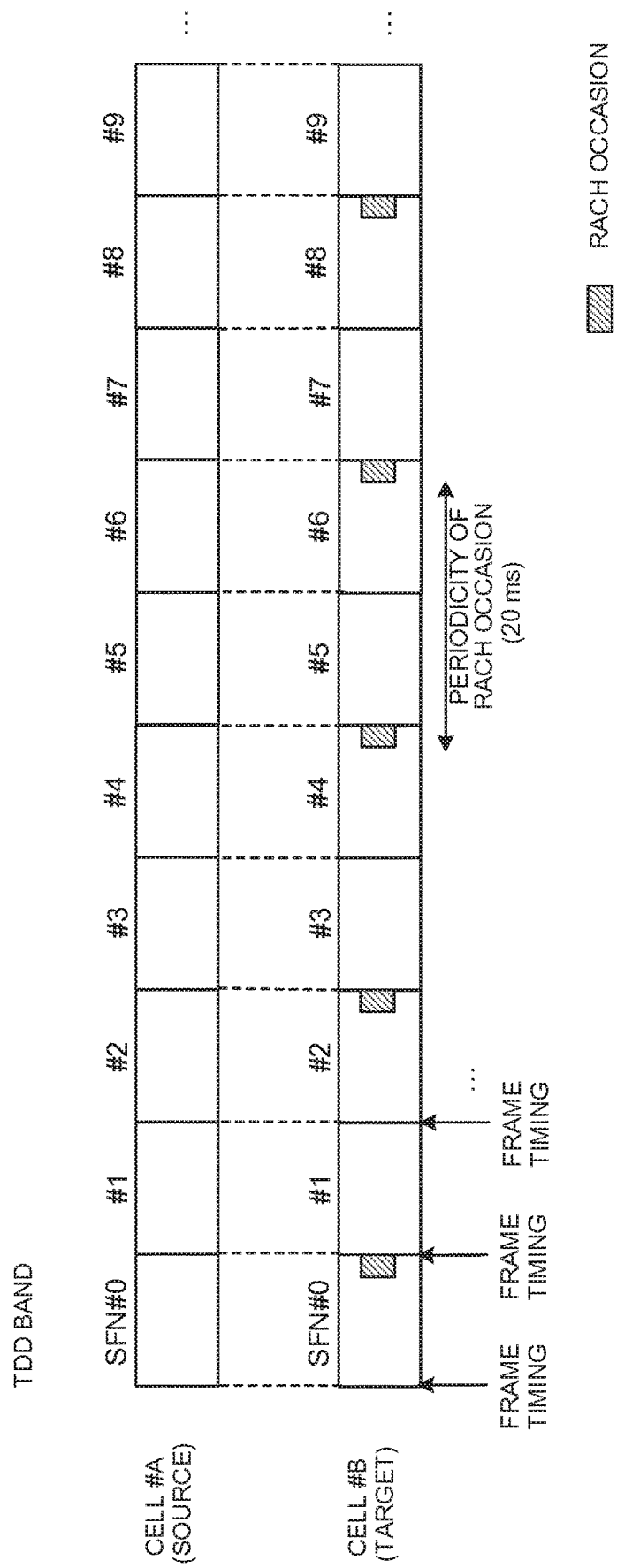
FIG. 2 is a diagram illustrating a first assumption example of an assumption related to inter-cell synchronization according to a first aspect.

FIG. 2 is a diagram illustrating the first assumption example related to inter-cell synchronization according to the first aspect. FIG. 2 exemplifies a case where handover is performed from a cell #A that is the serving cell to a cell #B that is a neighbor cell of the cell #A in the TDD band.

As illustrated in FIG. 2, in a case of the TDD band, the user terminal can assume that the frame timings and the SFNs match between the cell #A and the cell #B. Consequently, the user terminal can assume synchronization at a level of the SFNs between the cells #A and #B without a signaling in the case of the TDD band.

Thus, in FIG. 2, it is possible to assume that the frame timings and the SFNs match between the cell #A and the cell #B. Consequently, even when a periodicity of an RACH occasion of the cell #B is longer than 10 ms, it is possible to detect the RACH occasion based on the assumed SFN without decoding a PBCH. As a result, it is possible to reduce handover latency in the case of the TDD band.

On the other hand, it is not possible to assume that the frame timings and the SFNs match between the cell #A and the cell #B in the case of the FDD band. Hence, when the periodicity of the RACH occasion of the cell #B is longer than 10 ms as illustrated in FIG. 2, the user terminal decodes the PBCH, obtains the SFN, and detects the RACH occasion based on the SFN.

Second Assumption Example

In the second assumption example, the user terminal may determine whether or not to assume (whether or not it is possible to assume) that frame timings and SNFs match (synchronize) between a plurality of cells, based on above useServingCellTimingForSync.

More specifically, when above useServingCellTimingForSync is enabled, the user terminal may assume that frame timings and SFNs match between a source cell and a target cell. In this case, irrespectively of a frequency range (in any case of the FDD band or the TDD band), the user terminal may assume that the frame timings and the SFNs match (synchronize) between the source cell and the target cell.

On the other hand, when above useServingCellTimingForSync is disabled, the user terminal may not assume (may decide that it is not possible to assume) that the frame timings and the SFNs match between the source cell and the target cell. That is, the user terminal may assume that at least one of the frame timings and the SFNs do not match (do not synchronize) between the source cell and the target cell based on a frequency range (e.g., the FDD band or the TDD band).

FIGS. 3A to 3C are diagrams illustrating the second assumption example related to inter-cell synchronization according to the first aspect. FIGS. 3A to 3C exemplify cases where handover is performed from the cell #A that is a serving cell to the cell #B that is a neighbor cell of the cell #A.

When above useServingCellTimingForSync is enabled as illustrated in FIG. 3A, the user terminal may assume that the frame timings and the SFNs match between the cell #A and the cell #B irrespectively of the TDD band or the FDD band. As described above, useServingCellTimingForSync is information that indicates whether or not it is possible to derive an SSB index of the neighbor cell based on a timing of the serving cell.

In FIG. 3A, this useServingCellTimingForSync is used to determine whether or not to assume that the frame timings and the SFNs match between the cell #A and the cell #B. Hence, in FIG. 3A, it is possible to assume synchronization at a level of the SFNs between the cells #A and #B without adding a new signaling and, even when the periodicity of the RACH occasion of the cell #B is longer than 10 ms, it is possible to detect the RACH occasion based on the assumed SFN without decoding the PBCH.

On the other hand, when above useServingCellTimingForSync is disabled as illustrated in FIGS. 3B and 3C, the user terminal may assume that at least one of the frame timings and the SFNs do not match between the cell #A and the cell #B based on the frequency range (one of the TDD band and the FDD band).

For example, when above useServingCellTimingForSync is disabled as illustrated in FIG. 3B, the user terminal may assume that the frame timings match and the SFNs do not match between the cell #A and the cell #B in the case of the TDD band.

In FIG. 3B, when the periodicity of the RACH occasion of the cell #B is longer than 10 ms, the user terminal decodes a PBCH, obtains the SFN, and detects an RACH occasion (e.g., one of RACH occasions #0 and #1 whose periodicity is 20 ms in FIG. 3B) based on the SFN.

Furthermore, when above useServingCellTimingForSync is disabled as illustrated in FIG. 3C, the user terminal may assume that the frame timings and the SFNs do not match between the cell #A and the cell #B in the case of the FDD band.

In FIG. 3C, to detect the frame timing of the cell #B, the user terminal needs to obtain an SSB index and a half frame index from at least one of a DMRS pattern and a PBCH payload of the PBCH of the cell #B. Furthermore, when the periodicity of the RACH occasion of the cell #B is longer than 10 ms, the user terminal decodes the PBCH, obtains the SFN, and detects the RACH occasion (one of the RACH occasions #0 and #1 whose periodicity is 20 ms in FIG. 3B) based on the SFN.

As described above, according to the second assumption example, the user terminal determines whether or not to assume that frame timings and SFNs match between a plurality of cells, based on above useServingCellTimingForSync. Consequently, it is possible to make the above determination without adding a new signaling.

Third Assumption Example

In the third assumption example, the user terminal may determine whether or not to assume (whether or not it is possible to assume) that frame timings and SFNs match (synchronize) between a plurality of cells, based on above useServingCellTimingForSync and a frequency range.

More specifically, when above useServingCellTimingForSync is enabled, the user terminal may assume that frame timings and SFNs match (synchronize) between a source cell and a target cell in the case of the TDD band.

On the other hand, when above useServingCellTimingForSync is enabled, it may not be assumed that the frame timings and the SFNs match between the source cell and the target cell in the case of the FDD band. That is, in the case of the FDD band, the user terminal may assume that at least one of the frame timings and the SFNs do not match (do not synchronize) between the source cell and the target cell.

On the other hand, when above useServingCellTimingForSync is disabled, the user terminal may decide that it is not possible to assume that the frame timings and the SFNs match between the source cell and the target cell similar to the second assumption example. In this case, the user terminal may assume that at least one of the frame timings and the SFNs do not match (do not synchronize) between the source cell and the target cell based on the frequency range (e.g., the FDD band or the TDD band).

FIGS. 4A and 4B are diagrams illustrating the third assumption example related to inter-cell synchronization according to the first aspect. FIGS. 4A and 4B exemplify cases where handover is performed from the cell #A that is a serving cell to the cell #B that is a neighbor cell of the cell #A. Furthermore, FIGS. 4A and 4B assume that above useServingCellTimingForSync is enabled.

When above useServingCellTimingForSync is enabled as illustrated in FIG. 4A, the user terminal may assume that frame timings and SFNs match between the cell #A and the cell #B in the case of the TDD band. As described above, useServingCellTimingForSync is information that indicates whether or not it is possible to derive an SSB index of the neighbor cell based on a timing of the serving cell.

As illustrated in FIG. 4A, in the case of the TDD band, this useServingCellTimingForSync is used to determine whether or not to assume that the frame timings and the SFNs match between the cell #A and the cell #B, too. Hence, in FIG. 4A, it is possible to assume synchronization at a level of the SFNs between the cells #A and #B without adding a new signaling and, even when the periodicity of the RACH occasion of the cell #B is longer than 10 ms, it is possible to detect an RACH occasion based on the assumed SFN without decoding a PBCH.

On the other hand, when above useServingCellTimingForSync is enabled as illustrated in FIG. 4B, it may not be assumed that the frame timings and the SFNs match between the cell #A and the cell #B in the case of the FDD band. In this case, as illustrated in FIG. 4B, the user terminal may assume that the frame timings match, and the SFNs do not match between the cell #A and the cell #B.

Furthermore, when above useServingCellTimingForSync is disabled, the user terminal may operate similar to the second assumption example. That is, in the case of the TDD band, the user terminal may assume that the frame timings match and the SFNs do not match between the cell #A and the cell #B (see FIG. 3B). On the other hand, the user terminal may assume that the frame timings and the SFNs do not match between the cell #A and the cell #B in the case of the FDD band (see FIG. 3C).

Thus, according to the third assumption example, in the case of the TDD band, the user terminal may determine whether or not to assume that frame timings match between a plurality of cells, and assume that SFNs match between a plurality of cells based on above useServingCellTimingForSync.

On the other hand, according to the third assumption example, in the case of the FDD band, the user terminal may determine whether or not to assume that the SFNs do not match between a plurality of cells, and assume the frame timings match between a plurality of cells based on above useServingCellTimingForSync.

As described above, according to the third assumption example, in the case of the TDD band, the user terminal determines whether or not to assume that the frame timings and the SFNs match between a plurality of cells based on above useServingCellTimingForSync. Consequently, it is possible to make the above determination without adding a new signaling.

Fourth Assumption Example

In the fourth assumption example, the user terminal may determine whether or not to assume (whether or not it is possible to assume) that frame timings and SFNs match between a plurality of cells, based on a new signaling.

Figure 5A:
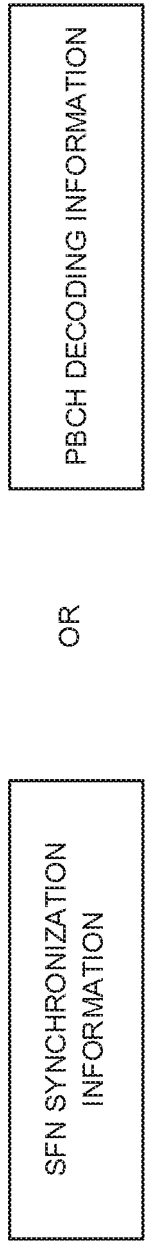
FIGS. 5A to 5C are diagrams illustrating information used in a fourth assumption example of an assumption related to inter-cell synchronization according to the first aspect.
Figure 5B:
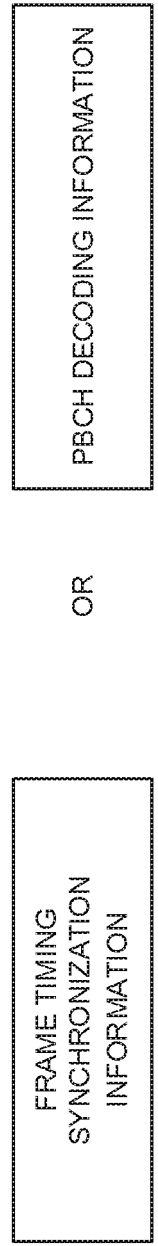
Figure 5C:

FIGS. 5A to 5C are diagrams illustrating the fourth assumption example of an assumption related to inter-cell synchronization according to the first aspect. When receiving information (SFN synchronization information) indicating that it is possible to assume that SFNs match between a source cell and a target cell, or information (PBCH decoding information) indicating that decoding of a PBCH in the target cell is not requested as illustrated in FIG. 5A, the user terminal may assume that the SFNs match between the source cell and the target cell.

Alternatively, when receiving information (frame timing synchronization information) indicating that it is possible to assume that the frame timings match between the source cell and the target cell, or the above PBCH decoding information as illustrated in FIG. 5B, the user terminal may assume that the frame timings match between the source cell and the target cell.

Alternatively, when receiving information (SFN/frame timing synchronization information) commonly indicating that it is possible to assume that the frame timings and the SFNs match between the source cell and the target cell, or the above PBCH decoding information as illustrated in FIG. 5C, the user terminal may assume that the frame timings and the SFNs match between the source cell and the target cell.

At least one of the above PBCH decoding information, frame timing synchronization information, SFN/frame timing synchronization information and PBCH decoding information may be notified to the user terminal by a higher layer signaling. In this regard, the higher layer signaling may be, for example, one of a Radio Resource Control (RRC) signaling, a Medium Access control (MAC) signaling and broadcast information, or a combination of these.

The broadcast information may be, for example, a Master Information Block (MIB), a System information Block (SIB) or Remaining Minimum System Information (RMSI).

For example, at least one of the SFN synchronization information, the frame timing synchronization information, the SFN/frame timing synchronization information and the PBCH decoding information may be a handover command or a value of a given field in an SIB, or may be a fact itself that the given field is included.

As described above, according to the fourth assumption example, the user terminal determines whether or not to assume that frame timings and SFNs match between a plurality of cells, based on an explicit signaling. Consequently, the user terminal can easily make the above determination.

(Second Aspect)

The second aspect will describe determination on whether or not to assume that frame timings and SFNs match between cells when cell re-selection is performed. Each assumption example described in the first aspect is applicable to cell re-selection, too.

More specifically, each assumption example is applicable to cell re-selection as appropriate by replacing a "source cell" and a "target cell" according to the first aspect with a "serving cell" and a camping candidate cell (neighbor cell)", respectively. In addition, according to the second aspect, above useServingCellTimingForSync used in the above second third assumption examples may be included in an SIB.

(Other Aspect)

The other aspect will describe determination on whether or not to assume that frame timings and SFNs match between cells when various procedures (e.g., cell addition procedure) performed by a user terminal are performed.

For example, each assumption example described in the first aspect is applicable to the cell addition procedure, too, as appropriate. More specifically, each assumption example is applicable to the cell addition procedure as appropriate by replacing "a source cell" and "a target cell" according to the first aspect with "an addition target cell (e.g., an SCell, a PSCell and a UL SCell of a different TAG)" and "a PCell or a PSCell (both will be also collectively referred to as a primary cell or a PCell in the other aspect)".

By applying the fourth assumption example in particular, it is possible to obtain an effect to suppress a latency time in the cell addition procedure. For example, whether or not to assume (whether or not it is possible to assume) that frame timings and SFNs match (synchronize) between a primary cell (a PCell on an LTE side in a case of E-UTRA NR Dual Connectivity with MCG using E-UTRA and SCG using NR (EN-DC), or a PCell on an NR side in a case of stand-alone of NR) and the addition target cell may be indicated by at least one of above PBCH decoding information, frame timing synchronization information, SFN/frame timing synchronization information and PBCH decoding information.

In this case, at least one of the above PBCH decoding information, frame timing synchronization information, SFN/frame timing synchronization information and PBCH decoding information may be transmitted from a radio base station (also referred to as, for example, a Master eNB or a Master gNB) that forms a Master Cell Group (MCG), or a radio base station (also referred to as, for example, a Secondary eNB or a Secondary gNB) that forms a Secondary Cell Group (SCG) to the user terminal. Consequently, it is possible to skip decoding of a PBCH of the additional target cell, detect an RACH occasion, and transmit a PRACH. As a result, it is possible to suppress the latency time in the cell addition procedure.

Furthermore, when the first assumption example is applied, and both frequency ranges of the primary cell and the addition target cell are TDD bands, it may be assumed that the SFNs and the frame timings match (SFN synchronization/frame timing synchronization) between the primary cell and the addition target cell. Consequently, it is possible to suppress the latency time in the cell addition procedure.

Furthermore, when the third assumption example is applied, both of the frequency ranges of the primary cell and the addition target cell are the TDD bands, and above useServingCellTimingForSync is enabled, it may be assumed that the SFNs and the frame timings match (SFN synchronization/frame timing synchronization) between the primary cell and the addition target cell. Consequently, it is possible to suppress the latency time in the cell addition procedure.

(Radio Communication System)

The configuration of the radio communication system according to the present embodiment will be described below. This radio communication system uses one or a combination of each of the above aspects of the present disclosure to perform communication.

Figure 6:
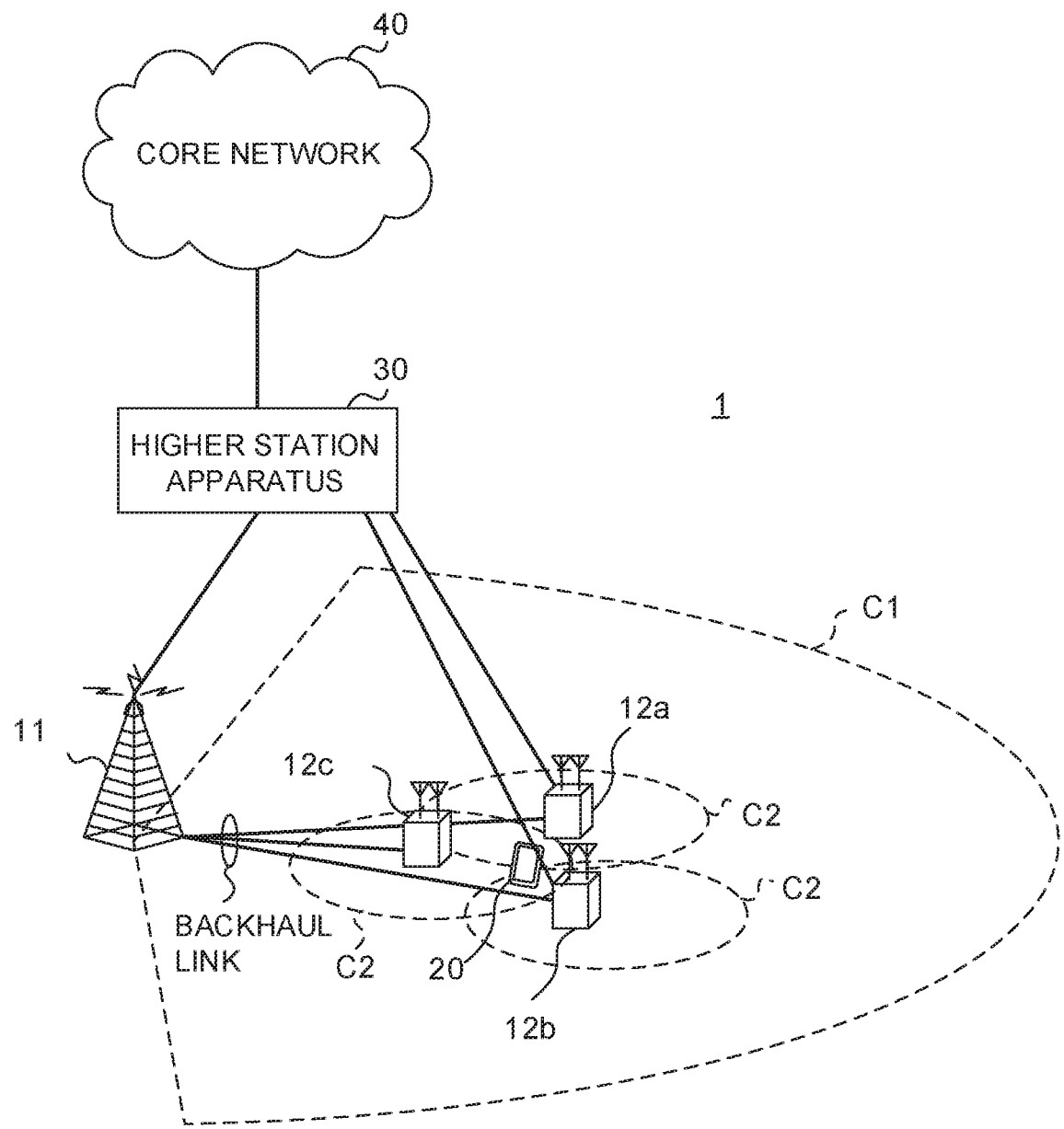
FIG. 6 is a diagram illustrating one example of a schematic configuration of a radio communication system according to the present embodiment.

FIG. 6 is a diagram illustrating one example of a schematic configuration of the radio communication system according to the present embodiment. A radio communication system 1 can apply Carrier Aggregation (CA) and/or Dual Connectivity (DC) that aggregate a plurality of base frequency blocks (component carriers) whose 1 unit is a system bandwidth (e.g., 20 MHz) of the LTE system.

In this regard, the radio communication system 1 may be referred to as Long Term Evolution (LTE), LTE-Advanced (LTE-A), LTE-Beyond (LTE-B), SUPER. 3G, IMT-Advanced, the 4th generation mobile communication system (4G), the 5th generation mobile communication system (5G), New Radio (NR), Future Radio Access (FRA) and the New Radio Access Technology (New-RAT), or a system that realizes these techniques.

The radio communication system 1 includes a radio base station 11 that forms a macro cell C1 of a relatively wide coverage, and radio base stations 12 (12a to 12c) that are located in the macro cell C1 and form small cells C2 narrower than the macro cell C1. Furthermore, a user terminal 20 is located in the macro cell C1 and each small cell C2. An arrangement and the numbers of respective cells and the user terminals 20 are not limited to the aspect illustrated in FIG. 6.

The user terminal 20 can connect with both of the radio base station 11 and the radio base stations 12. The user terminal 20 is assumed to concurrently use the macro cell C1 and the small cells C2 by using CA or DC. Furthermore, the user terminal 20 may apply CA or DC by using a plurality of cells (CCs).

The user terminal 20 and the radio base station 11 can communicate by using a carrier (also referred to as a legacy carrier) of a narrow bandwidth in a relatively low frequency band (e.g., 2 GHz). On the other hand, the user terminal 20 and each radio base station 12 may use a carrier of a wide bandwidth in a relatively high frequency band (e.g., 3.5 GHz or 5 GHz) or may use the same carrier as that used between the user terminal 20 and the radio base station 11. In this regard, a configuration of the frequency band used by each radio base station is not limited to this.

Furthermore, the user terminal 20 can perform communication by using Time Division Duplex (TDD) and/or Frequency Division Duplex (FDD) in each cell. Furthermore, each cell (carrier) may be applied a single numerology or may be applied a plurality of different numerologies.

The numerology may be a communication parameter to be applied to transmission and/or reception of a certain signal and/or channel, and may indicate at least one of, for example, a subcarrier spacing, a bandwidth, a symbol length, a cyclic prefix length, a subframe length, a TTI length, the number of symbols per TTI, a radio frame configuration, specific filtering processing performed by a transceiver in a frequency domain, and specific windowing processing performed by the transceiver in a time domain. For example, a case where subcarrier spacings of constituent OFDM symbols are different and/or a case where the numbers of OFDM symbols are different on a certain physical channel may be read as that numerologies are different.

The radio base station 11 and each radio base station 12 (or the two radio base stations 12) may be connected by way of wired connection (e.g., optical fibers compliant with a Common Public Radio Interface (CPRI) or an X2 interface) or radio connection.

The radio base station 11 and each radio base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MMF), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB) or a transmission/reception point. Furthermore, each radio base station 12 is a radio base station that has a local coverage, and may be referred to as a small base station, a micro base station, a pico base station, a femto base station, a Home eNodeB (HeNB), a Remote Radio Head (RRH) or a transmission/reception point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal (mobile station) but also a fixed communication terminal (fixed station).

The radio communication system 1 applies Orthogonal Frequency-Division Multiple Access (OFDMA) to downlink and applies Single Carrier-Frequency Division Multiple Access (SC-FDMA) and/or OFDMA to uplink as radio access schemes.

OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into bands including one or contiguous resource blocks per terminal and causes a plurality of terminals to use respectively different bands to reduce an inter-terminal interference. In this regard, uplink and downlink radio access schemes are not limited to a combination of these schemes, and other radio access schemes may be used.

The radio communication system 1 uses a downlink shared channel (PDSCH: Physical Downlink Shared Channel) shared by each user terminal 20, a broadcast channel (PBCH: Physical Broadcast Channel) and a downlink L1/L2 control channel as downlink channels. User data, higher layer control information and a System Information Block (SIB) are conveyed on the PDSCH. Furthermore, a Master Information Block (MIB) is conveyed on the PBCH.

The downlink L1/L2 control channel includes a Physical Downlink Control Channel (PDCCH), an Enhanced Physical Downlink Control Channel (EPDCCH), a Physical Control Format Indicator Channel (PCFICH), and a Physical Hybrid-ARQ Indicator Channel (PHICH). Downlink Control Information (DCI) including scheduling information of the PDSCH and/or the PUSCH is conveyed on the PDCCH.

For example, DCI for scheduling DL data reception may be referred to as a DL assignment, and DCI for scheduling UL data transmission may be referred to as a UL grant.

The number of OFDM symbols used for the PDCCH is conveyed on the PCFICH. Transmission acknowledgement information (also referred to as, for example, retransmission control information, HARQ-ACK or ACK/NACK) of a Hybrid Automatic Repeat reQuest (HARQ) for the PUSCH is conveyed on the PHICH. The EPDCCH is subjected to frequency division multiplexing with the PDSCH (downlink shared data channel) and is used to convey DCI similar to the PDCCH.

The radio communication system 1 uses an uplink shared channel (PUSCH: Physical Uplink Shared Channel) shared by each user terminal 20, an uplink control channel (PUCCH: Physical Uplink Control Channel), and a random access channel (PRACH: Physical Random Access Channel) as uplink channels. User data and higher layer control information are conveyed on the PUSCH. Furthermore, downlink radio quality information (CQI: Channel Quality Indicator), transmission acknowledgement information and a Scheduling Request (SR) are conveyed on the PUCCH. A random access preamble for establishing connection with a cell is conveyed on the PRACH.

The radio communication system 1 conveys a Cell-specific Reference Signal (CRS), a Channel State Information-Reference Signal (CSI-RS), a DeModulation Reference Signal (DMRS) and a Positioning Reference Signal (PRS) as downlink reference signals. Furthermore, the radio communication system 1 conveys a Sounding Reference Signal (SRS) and a DeModulation Reference Signal (DMRS) as uplink reference signals. In this regard, the DMRS may be referred to as a user terminal-specific reference signal (UEspecific reference signal). Furthermore, a reference signal to be conveyed is not limited to these.

<Radio Base Station>

Figure 7:
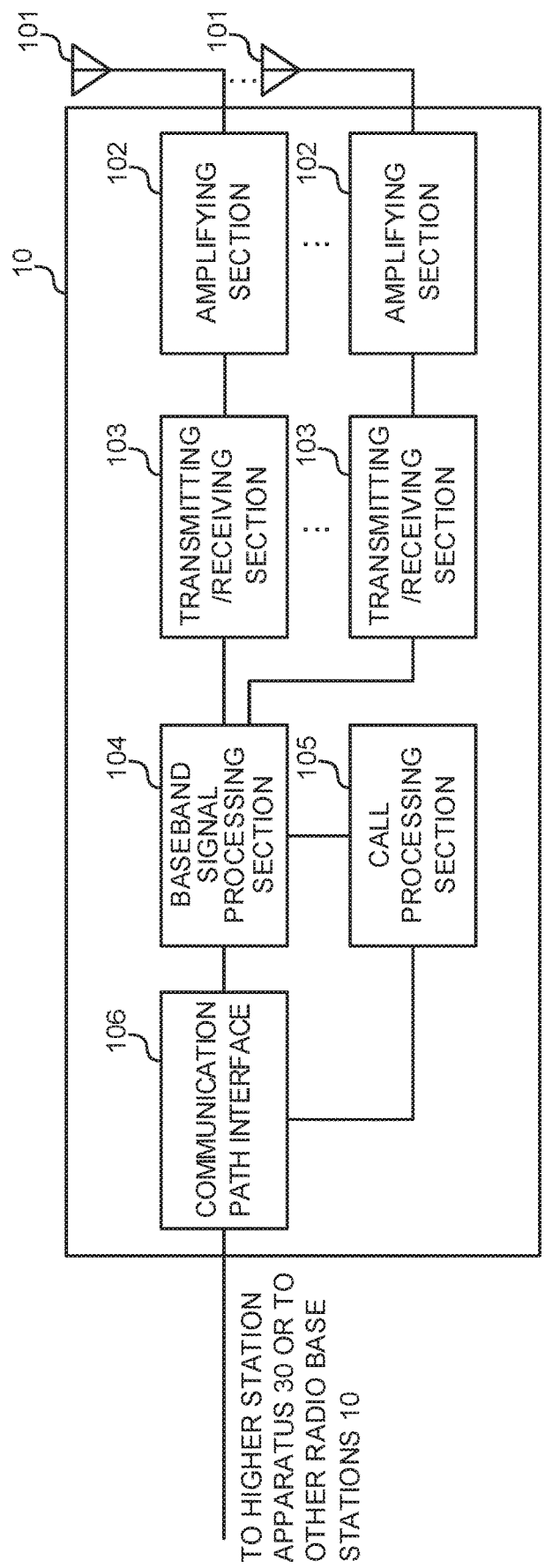
FIG. 7 is a diagram illustrating one example of an overall configuration of a radio base station according to the present embodiment.

FIG. 7 is a diagram illustrating one example of an overall configuration of the radio base station according to the present embodiment. The radio base station 10 includes pluralities of transmission/reception antennas 101, amplifying sections 102 and transmitting/receiving sections 103, a baseband signal processing section 104, a call processing section 105 and a channel interface 106. In this regard, the radio base station 10 only needs to be configured to include one or more of each of the transmission/reception antennas 101, the amplifying sections 102 and the transmitting/receiving sections 103.

User data transmitted from the radio base station 10 to the user terminal 20 on downlink is input from the higher station apparatus 30 to the baseband signal processing section 104 via the channel interface 106.

The baseband signal processing section 104 performs processing of a Packet Data Convergence Protocol (PDCP) layer, segmentation and concatenation of the user data, transmission processing of a Radio Link Control (RLC) layer such as RLC retransmission control, Medium Access Control (MAC) retransmission control (e.g., HARQ transmission processing), and transmission processing such as scheduling, transmission format selection, channel coding, inverse Fast Fourier Transform (IFFT) processing, and preceding processing on the user data, and transfers the user data to each transmitting/receiving section 103. Furthermore, the baseband signal processing section 104 performs transmission processing such as channel coding and inverse fast Fourier transform on a downlink control signal, too, and transfers the downlink control signal to each transmitting/receiving section 103.

Each transmitting/receiving section 103 converts a baseband signal precoded and output per antenna from the baseband signal processing section 104 into a radio frequency range, and transmits a radio frequency signal. The radio frequency signal subjected to frequency conversion by each transmitting/receiving section 103 is amplified by each amplifying section 102, and is transmitted from each transmission/reception antenna 101. The transmitting/receiving sections 103 can be composed of transmitters/receivers, transmission/reception circuits or transmission/reception apparatuses described based on a common knowledge in a technical field according to the present disclosure. In this regard, the transmitting/receiving sections 103 may be composed as an integrated transmitting/receiving section or may be composed of transmitting sections and receiving sections.

Meanwhile, each amplifying section 102 amplifies a radio frequency signal received by each transmission/reception antenna 101 as an uplink signal. Each transmitting/receiving section 103 receives the uplink signal amplified by each amplifying section 102. Each transmitting/receiving section 103 performs frequency conversion on the received signal into a baseband signal, and outputs the baseband signal to the baseband signal processing section 104.

The baseband signal processing section 104 performs Fast Fourier Transform (FFT) processing, inverse Discrete Fourier Transform (IDFT) processing, error correcting decoding, MAC retransmission control reception processing, and reception processing of an RLC layer and a PDCP layer on user data included in the input uplink signal, and transfers the user data to the higher station apparatus 30 via the channel interface 106. The call processing section 105 performs call processing (such as a configuration and release) of a communication channel, state management of the radio base station 10 and radio resource management.

The channel interface 106 transmits and receives signals to and from the higher station apparatus 30 via a given interface. Furthermore, the channel interface 106 may transmit and receive (backhaul signaling) signals to and from the another radio base station 10 via an inter-base station interface (e.g., optical fibers compliant with the Common Public Radio Interface (CPRI) or the X2 interface).

In addition, each transmitting/receiving section 103 may further include an analog beam forming section that performs analog beam forming. The analog beam forming section can be composed of an analog beam forming circuit (e.g., a phase shifter or a phase shift circuit) or an analog beam forming apparatus (e.g., a phase shifter) described based on the common knowledge in the technical field according to the present invention. Furthermore, each transmission/reception antenna 101 may be composed of an array antenna, for example.

Each transmitting/receiving section 103 transmits measurement signals of a plurality of cells (e.g., a first cell and a second cell). Each transmitting/receiving section 103 may transmit information related to at least one of intra-frequency measurement and inter-frequency measurement to the user terminal 20. Furthermore, each transmitting/receiving section 103 may transmit at least one of above useServingCellTimingForSync, SFN synchronization information, frame timing synchronization information, SFN/frame timing synchronization information and PBCH decoding information.

Figure 8:
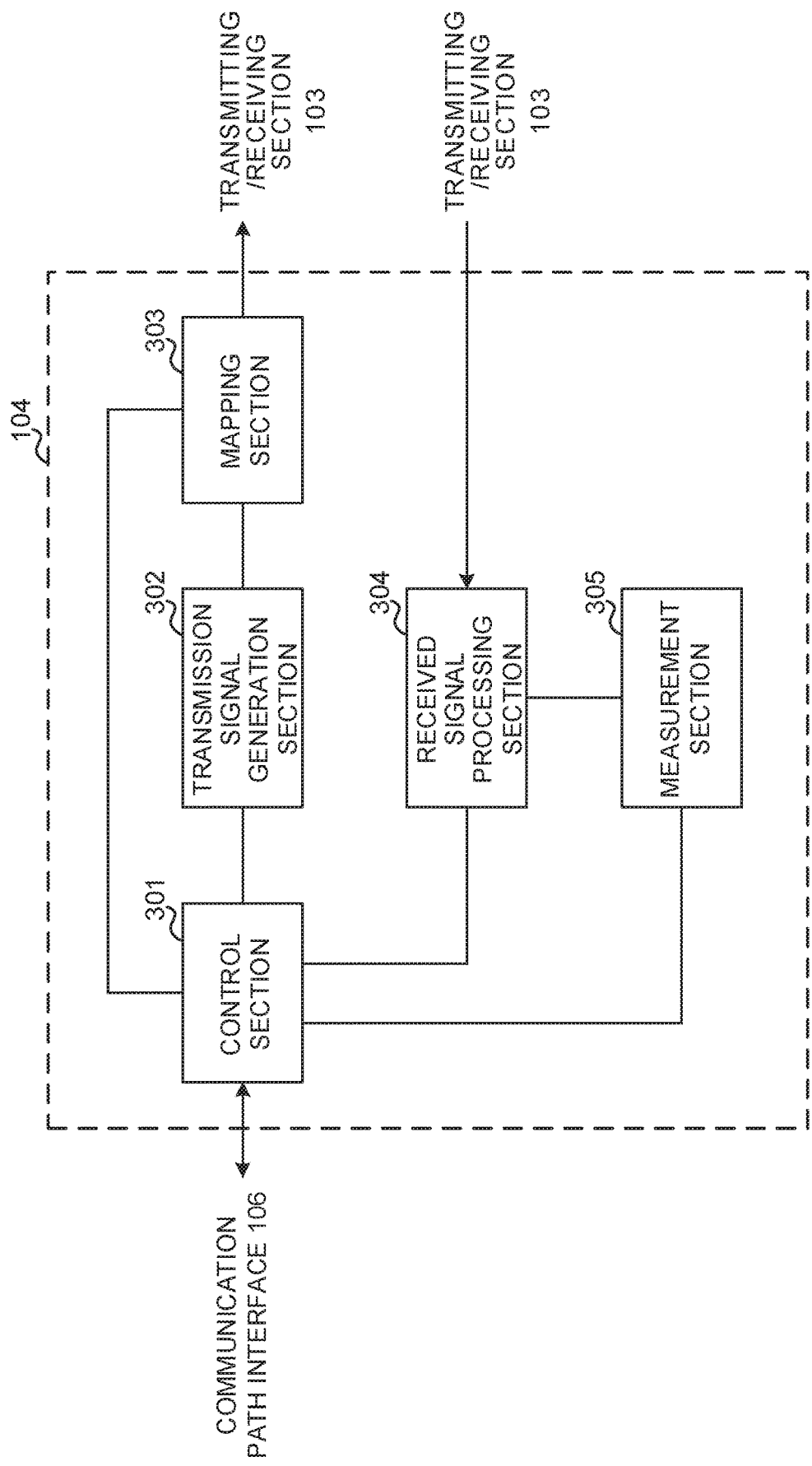
FIG. 8 is a diagram illustrating one example of a function configuration of the radio base station according to the present embodiment.

FIG. 8 is a diagram illustrating one example of a function configuration of the radio base station according to the present embodiment of the present disclosure. In addition, this example mainly illustrates function blocks of characteristic portions according to the present embodiment, and assumes that the radio base station 10 includes other function blocks, too, that are necessary for radio communication.

The baseband signal processing section 104 includes at least a control section (scheduler) 301, a transmission signal generating section 302, a mapping section 303, a received signal processing section 304 and a measurement section 305. In addition, these components only need to be included in the radio base station 10, and part or all of the components may not be included in the baseband signal processing section 104.

The control section (scheduler) 301 controls the entire radio base station 10. The control section 301 can be composed of a controller, a control circuit or a control apparatus described based on the common knowledge in the technical field according to the present disclosure.

The control section 301 controls, for example, signal generation of the transmission signal generating section 302 and signal allocation of the mapping section 303. Furthermore, the control section 301 controls signal reception processing of the received signal processing section 304 and signal measurement of the measurement section 305.

The control section 301 controls scheduling (e.g., resource allocation) of system information, a downlink data signal (e.g., a signal that is transmitted on the PDSCH), and a downlink control signal (e.g., a signal that is transmitted on the PDCCH and/or the EPDCCH and is, for example, transmission acknowledgement information). Furthermore, the control section 301 controls generation of a downlink control signal and a downlink data signal based on a result obtained by deciding whether or not it is necessary to perform retransmission control on an uplink data signal.

The control section 301 controls scheduling of a synchronization signal block or a downlink reference signal (e.g., a CRS, a CSI-RS or a DMRS).

The control section 301 controls scheduling of an uplink data signal (e.g., a signal that is transmitted on the PUSCH), an uplink control signal (e.g., a signal that is transmitted on the PDCCH and/or the PUSCH and is, for example, transmission acknowledgement information), a random access preamble (e.g., a signal that is transmitted on the PRACH) and an uplink reference signal.

The control section 301 may perform control to form a transmission beam and/or a reception beam by using digital BF (e.g., preceding) in the baseband signal processing section 104 and/or analog BF (e.g., phase rotation) in each transmitting/receiving section 103. The control section 301 may perform control to form a beam based on downlink channel information or uplink channel information. The control section 301 may obtain these pieces of channel information from the received signal processing section 304 and/or the measurement section 305.

The control section 301 controls mobility (e.g., handover or cell re-selection) of the user terminal 20. More specifically, the control section 301 controls handover preparation processing between the radio base station and a target base station (or a source base station) based on a measurement report from the user terminal 20. Furthermore, the control section 301 controls transmission of a handover command to the user terminal 20.

The transmission signal generating section 302 generates a downlink signal (such as a downlink control signal, a downlink data signal or a downlink reference signal) based on an instruction from the control section 301, and outputs the downlink signal to the mapping section 303. The transmission signal generating section 302 can be composed of a signal generator, a signal generating circuit or a signal generating apparatus described based on the common knowledge in the technical field according to the present disclosure.

The transmission signal generating section 302 generates, for example, a DL assignment for giving notification of downlink data allocation information, and/or a UL grant for giving notification of uplink data allocation information based on the instruction from the control section 301. The DL assignment and the UL grant are both DCI, and conform to a DCI format. Furthermore, the transmission signal generating section 302 performs encoding processing and modulation processing on the downlink data signal according to a code rate and a modulation scheme determined based on Channel State Information (CSI) from each user terminal 20.

The mapping section 303 maps the downlink signal generated by the transmission signal generating section 302, on given radio resources based on the instruction from the control section 301, and outputs the downlink signal to each transmitting/receiving section 103. The mapping section 303 can be composed of a mapper, a mapping circuit or a mapping apparatus described based on the common knowledge in the technical field according to the present disclosure.

The received signal processing section 304 performs reception processing (e.g., demapping, demodulation and decoding) on a received signal input from each transmitting/receiving section 103. In this regard, the received signal is, for example, an uplink signal (such as an uplink control signal, an uplink data signal or an uplink reference signal) transmitted from the user terminal 20. The received signal processing section 304 can be composed of a signal processor, a signal processing circuit or a signal processing apparatus described based on the common knowledge in the technical field according to the present disclosure.

The received signal processing section 304 outputs information decoded by the reception processing to the control section 301. When, for example, receiving the PUCCH including HARQ-ACK, the received signal processing section 304 outputs the HARQ-ACK to the control section 301. Furthermore, the received signal processing section 304 outputs the received signal and/or the signal after the reception processing to the measurement section 305.

The measurement section 305 performs measurement related to the received signal. The measurement section 305 can be composed of a measurement instrument, a measurement circuit or a measurement apparatus described based on the common knowledge in the technical field according to the present disclosure.

For example, the measurement section 305 may perform Radio Resource Management (RRM) measurement or Channel State Information (CSI) measurement based on the received signal. The measurement section 305 may measure received power (e.g., Reference Signal Received Power (RSRP)), received quality (e.g., Reference Signal Received Quality (RSRQ), a Signal to Interference plus Noise Ratio (SINR) or a Signal to Noise Ratio (SNR)), a signal strength (e.g., a Received Signal Strength Indicator (RSSI)) or channel information (e.g., CSI). The measurement section 305 may output a measurement result to the control section 301.

<User Terminal>

Figure 9:
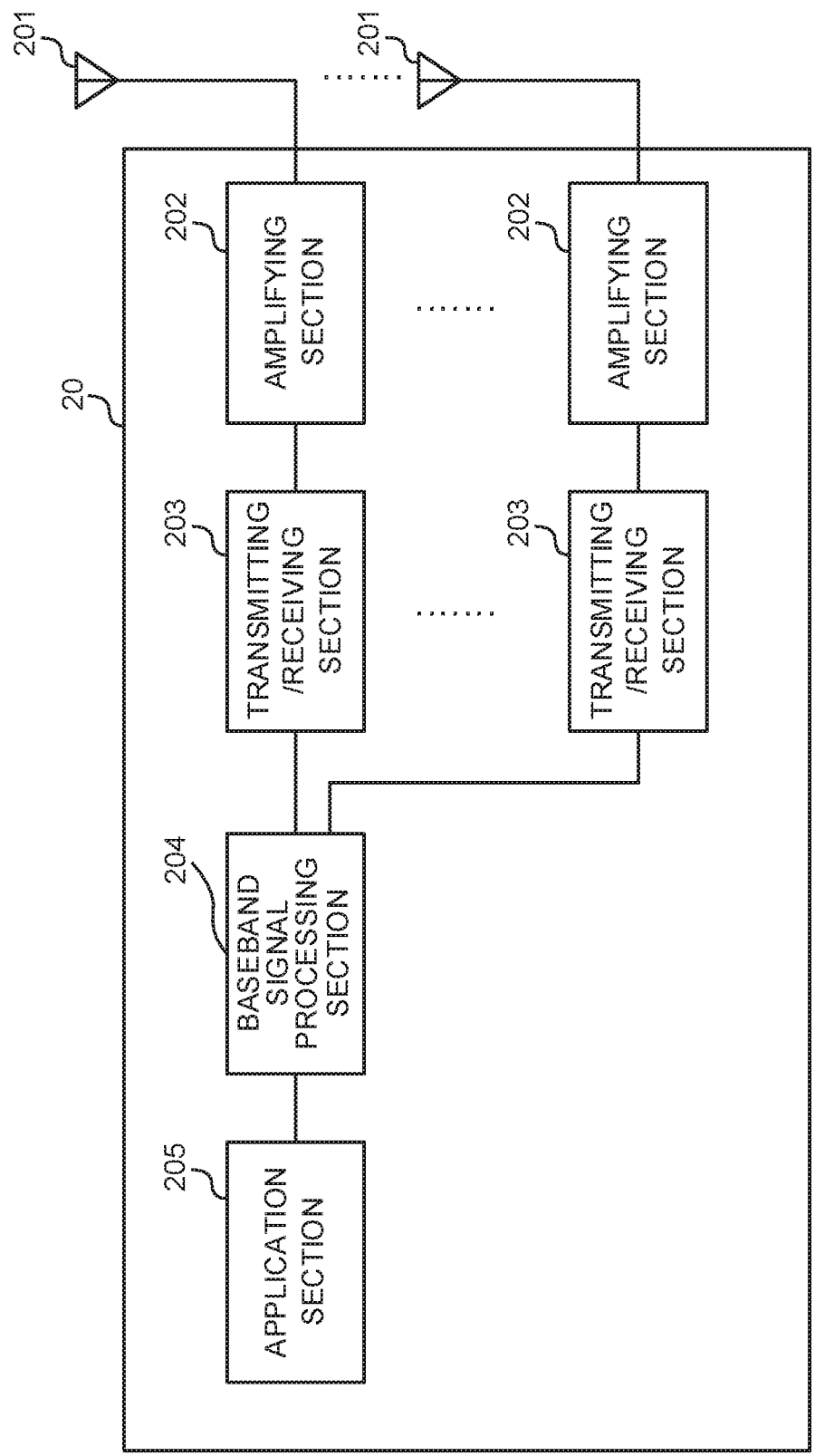
FIG. 9 is a diagram illustrating one example of an overall configuration of a user terminal according to the present embodiment.

FIG. 9 is a diagram illustrating one example of an overall configuration of the user terminal according to the present embodiment. The user terminal 20 includes pluralities of transmission/reception antennas 201, amplifying sections 202 and transmitting/receiving sections 203, a baseband signal processing section 204 and an application section 205. In this regard, the user terminal 20 only needs to be configured to include one or more of each of the transmission/reception antennas 201, the amplifying sections 202 and the transmitting/receiving sections 203.

Each amplifying section 202 amplifies a radio frequency signal received at each transmission/reception antenna 201. Each transmitting/receiving section 203 receives a downlink signal amplified by each amplifying section 202. Each transmitting/receiving section 203 performs frequency conversion on the received signal into a baseband signal, and outputs the baseband signal to the baseband signal processing section 204. The transmitting/receiving sections 203 can be composed of transmitters/receivers, transmission/reception circuits or transmission/reception apparatuses described based on the common knowledge in the technical field according to the present disclosure. In this regard, the transmitting/receiving sections 203 may be composed as an integrated transmitting/receiving section or may be composed of transmitting sections and receiving sections.

The baseband signal processing section 204 performs FFT processing, error correcting decoding and retransmission control reception processing on the input baseband signal. The baseband signal processing section 204 transfers downlink user data to the application section 205. The application section 205 performs processing related to layers higher than a physical layer and an MAC layer. Furthermore, the baseband signal processing section 204 may transfer broadcast information of the downlink data, too, to the application section 205.

On the other hand, the application section 205 inputs uplink user data to the baseband signal processing section 204. The baseband signal processing section 204 performs retransmission control transmission processing (e.g., HARQ transmission processing), channel coding, preceding, Discrete Fourier Transform (DFT) processing and IFFT processing on the uplink user data, and transfers the uplink user data to each transmitting/receiving section 203.

Each transmitting/receiving section 203 converts the baseband signal output from the baseband signal processing section 204 into a radio frequency range, and transmits a radio frequency signal. The radio frequency signal subjected to the frequency conversion by each transmitting/receiving section 203 is amplified by each amplifying section 202, and is transmitted from each transmission/reception antenna 201.

In addition, each transmitting/receiving section 203 may further include an analog beam forming section that performs analog beam forming. The analog beam forming section can be composed of an analog beam forming circuit (e.g., a phase shifter or a phase shift circuit) or an analog beam forming apparatus (e.g., a phase shifter) described based on the common knowledge in the technical field according to the present invention. Furthermore, each transmission/reception antenna 201 may be composed of an array antenna, for example.

Each transmitting/receiving section 203 receives the measurement signals of a plurality of cells (e.g., the first cell and the second cell). Each transmitting/receiving section 203 may receive the information related to at least one of intra-frequency measurement and inter-frequency measurement in the user terminal 20. Furthermore, each transmitting/receiving section 203 may receive at least one of above useServingCellTimingForSync, the SFN synchronization information, the frame timing synchronization information, the SFN/frame timing synchronization information and the PBCH decoding information.

Figure 10:
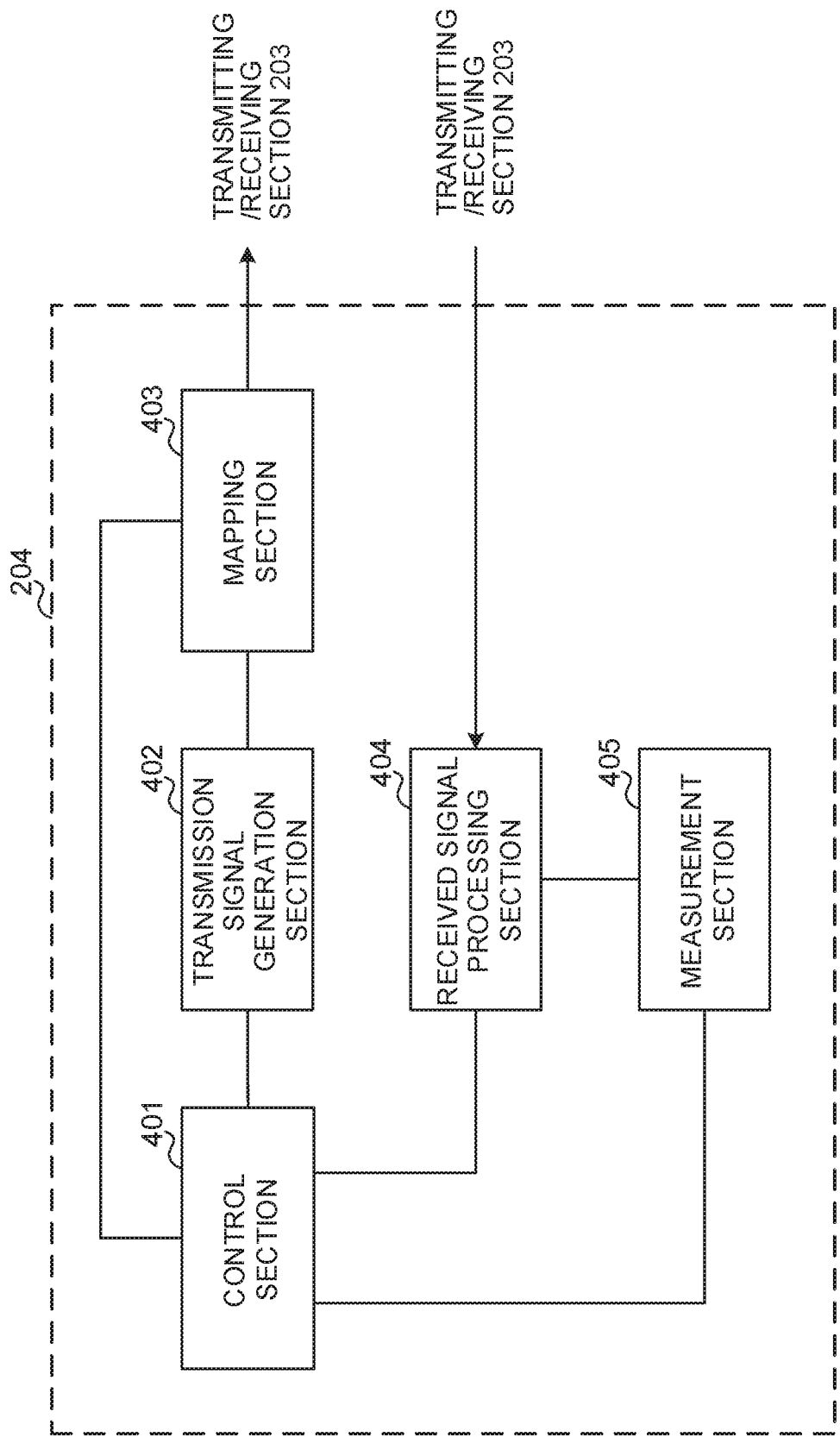
FIG. 10 is a diagram illustrating one example of a function configuration of the user terminal according to the present embodiment.

FIG. 10 is a diagram illustrating one example of a function configuration of the user terminal according to the present embodiment. In addition, this example mainly illustrates function blocks of characteristic portions according to the present embodiment, and assumes that the user terminal 20 includes other function blocks, too, that are necessary for radio communication.

The baseband signal processing section 204 of the user terminal 20 includes at least a control section 401, a transmission signal generating section 402, a mapping section 403, a received signal processing section 404 and a measurement section 405. In addition, these components only need to be included in the user terminal 20, and part or all of the components may not be included in the baseband signal processing section 204.

The control section 401 controls the entire user terminal 20. The control section 401 can be composed of a controller, a control circuit or a control apparatus described based on the common knowledge in the technical field according to the present disclosure.

The control section 401 controls, for example, signal generation of the transmission signal generating section 402 and signal allocation of the mapping section 403. Furthermore, the control section 401 controls signal reception processing of the received signal processing section 404 and signal measurement of the measurement section 405.

The control section 401 obtains from the received signal processing section 404 a downlink control signal and a downlink data signal transmitted from the radio base station 10. The control section 401 controls generation of an uplink control signal and/or an uplink data signal based on a result obtained by deciding whether or not it is necessary to perform retransmission control on the downlink control signal and/or the downlink data signal.

The control section 401 may perform control to form a transmission beam and/or a reception beam by using digital BF (e.g., precoding) in the baseband signal processing section 204 and/or analog BF (e.g., phase rotation) in each transmitting/receiving section 203. The control section 401 may perform control to form a beam based on downlink channel information or uplink channel information. The control section 401 may obtain these pieces of channel information from the received signal processing section 404 and/or the measurement section 405.

When at least one of handover and cell re-selection is performed, the control section 401 may determine whether or not to assume that frame timings (timings of radio frames) and SFNs (numbers assigned to the radio frames) match between a plurality of cells (e.g., the first cell and the second cell) (first and second aspects).

More specifically, in a case of a frequency range of Time Division Duplex (TDD), the control section 401 may assume that the frame timings and the SFNs match between a plurality of cells (e.g., the first cell and the second cell) (the first assumption example of the first and second aspects).

Furthermore, when above useServingCellTimingForSync (information indicating that it is possible to derive an index of a synchronization signal block transmitted by a neighbor cell based on a timing of a serving cell) is enabled (when above useServingCellTimingForSync is received or useServingCellTimingForSync configured to enabled is received), the control section 401 may assume that the frame timings and the SFNs match between a plurality of cells (e.g., the first cell and the second cell) (the second assumption example of the first and second aspects).

Furthermore, when above useServingCellTimingForSync is enabled, and in a case of a frequency range of Time Division Duplex (TDD), the control section 401 may assume that the frame timings and the SFNs match between a plurality of cells (e.g., the first cell and the second cell) (the third assumption example of the first and second aspects).

Furthermore, when above useServingCellTimingForSync is enabled, and in a case of a frequency range of Frequency Division Duplex (FDD), the control section 401 may not assume that the frame timings and the SFNs match between a plurality of cells (e.g., the first cell and the second cell) (the third assumption example of the first and second aspects). In this case, the control section 401 may assume that the frame timings match, and the SFNs do not match.

Furthermore, when both of the SFN synchronization information and the frame timing synchronization information are received, or when one of the SFN/frame timing synchronization information and the PBCH decoding information is received, the control section 401 may assume that the frame timings and the SFNs match between a plurality of cells (e.g., the first cell and the second cell) (the fourth assumption example of the first and second aspects).

Furthermore, when obtaining from the received signal processing section 404 various pieces of information notified from the radio base station 10, the control section 401 may update parameters used for control based on the various pieces of information.

The transmission signal generating section 402 generates an uplink signal (such as an uplink control signal, an uplink data signal or an uplink reference signal) based on an instruction from the control section 401, and outputs the uplink signal to the mapping section 403. The transmission signal generating section 402 can be composed of a signal generator, a signal generating circuit or a signal generating apparatus described based on the common knowledge in the technical field according to the present disclosure.

The transmission signal generating section 402 generates, for example, an uplink control signal related to transmission acknowledgement information and Channel State Information (CSI) based on the instruction from the control section 401. Furthermore, the transmission signal generating section 402 generates an uplink data signal based on the instruction from the control section 401. When, for example, the downlink control signal notified from the radio base station 10 includes a UL grant, the transmission signal generating section 402 is instructed by the control section 401 to generate an uplink data signal.

The mapping section 403 maps the uplink signal generated by the transmission signal generating section 402, on radio resources based on the instruction from the control section 401, and outputs the uplink signal to each transmitting/receiving section 203. The mapping section 403 can be composed of a mapper, a mapping circuit or a mapping apparatus described based on the common knowledge in the technical field according to the present disclosure.

The received signal processing section 404 performs reception processing (e.g., demapping, demodulation and decoding) on the received signal input from each transmitting/receiving section 203. In this regard, the received signal is, for example, a downlink signal (such as a downlink control signal, a downlink data signal or a downlink reference signal) transmitted from the radio base station 10. The received signal processing section 404 can be composed of a signal processor, a signal processing circuit or a signal processing apparatus described based on the common knowledge in the technical field according to the present disclosure. Furthermore, the received signal processing section 404 can compose the receiving section according to the present disclosure.

The received signal processing section 404 outputs information decoded by the reception processing to the control section 401. The received signal processing section 404 outputs, for example, broadcast information, system information, an RRC signaling and DCI to the control section 401. Furthermore, the received signal processing section 404 outputs the received signal and/or the signal after the reception processing to the measurement section 405.

The measurement section 405 performs measurement related to the received signal. For example, the measurement section 405 may perform at least one of intra-frequency measurement and inter-frequency measurement that uses an SSB on one or both of a first carrier and a second carrier. The measurement section 405 can be composed of a measurement instrument, a measurement circuit or a measurement apparatus described based on the common knowledge in the technical field according to the present disclosure.

For example, the measurement section 405 may perform RRM measurement or CSI measurement based on the received signal. The measurement section 405 may measure received power (e.g., RSRP), received quality (e.g., RSRQ, an SINR or an SNR), a signal strength (e.g., RSSI) or channel information (e.g., CSI). The measurement section 405 may output a measurement result to the control section 401.

<Hardware Configuration>

In addition, the block diagrams used to describe the above embodiment illustrate blocks in function units. These function blocks (components) are realized by an optional combination of hardware and/or software. Furthermore, a method for realizing each function block is not limited in particular. That is, each function block may be realized by using one physically and/or logically coupled apparatus or may be realized by using a plurality of these apparatuses formed by connecting two or more physically and/or logically separate apparatuses directly and/or indirectly (by using, for example, wired connection and/or radio connection).

Figure 11:
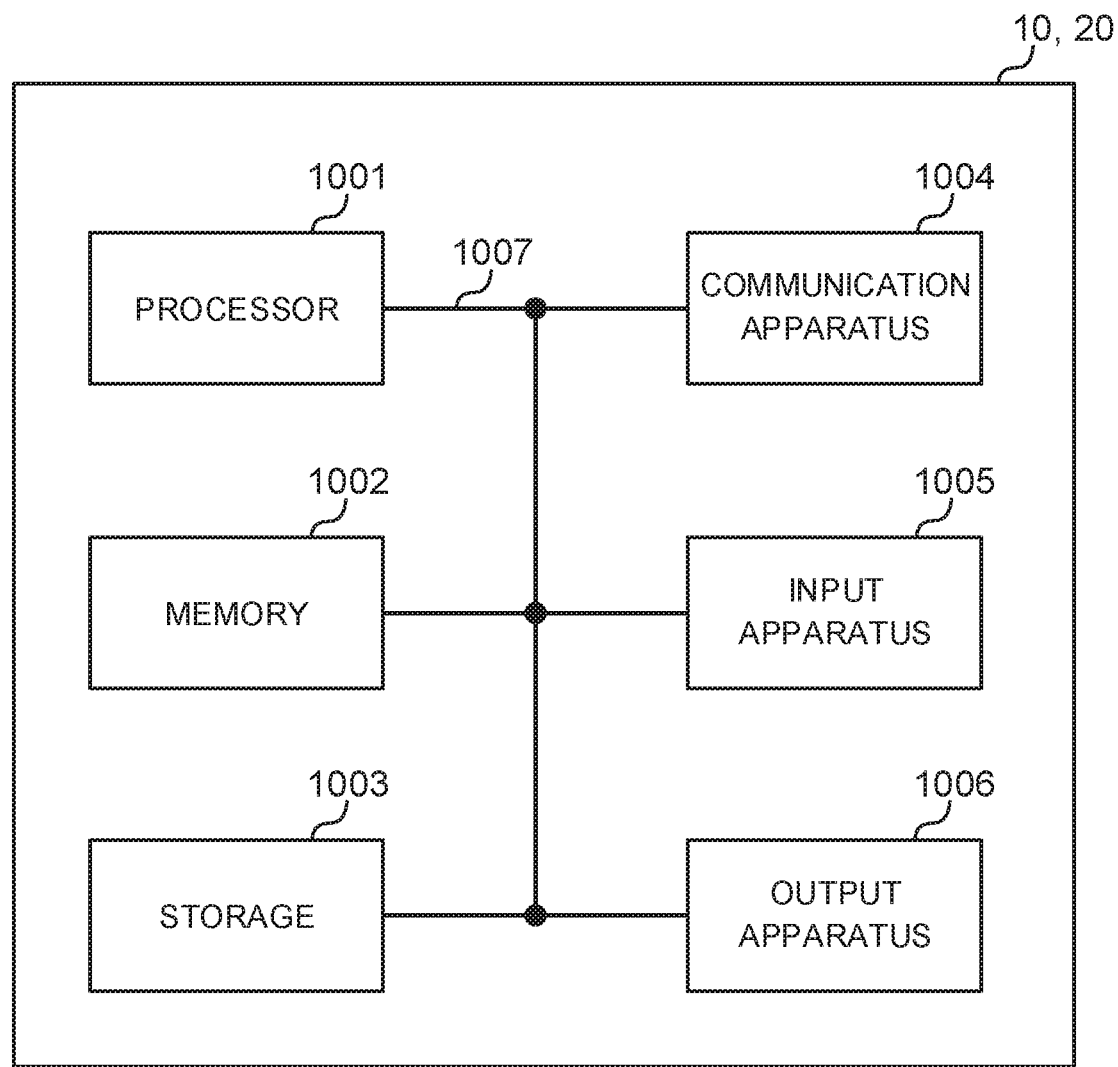
FIG. 11 is a diagram illustrating one example of hardware configurations of the radio base station and the user terminal according to the present embodiment.

For example, the radio base station and the user terminal according to the present embodiment of the present disclosure may function as computers that perform processing of the radio communication method according to the present disclosure. FIG. 11 is a diagram illustrating one example of the hardware configurations of the radio base station and the user terminal according to the present embodiment. The above-described radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 11 or may be configured without including part of the apparatuses.

For example, FIG. 11 illustrates the only one processor 1001. However, there may be a plurality of processors. Furthermore, processing may be executed by 1 processor or processing may be executed by 1 or more processors concurrently or successively or by using another method. In addition, the processor 1001 may be implemented by 1 or more chips.

Each function of the radio base station 10 and the user terminal 20 is realized by, for example, causing hardware such as the processor 1001 and the memory 1002 to read given software (program), and thereby causing the processor 1001 to perform an operation, and control communication via the communication apparatus 1004 and control reading and/or writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above-described baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to these programs, software module or data. As the programs, programs that cause the computer to execute at least part of the operations described in the above-described embodiment are used. For example, the control section 401 of the user terminal 20 may be realized by a control program that is stored in the memory 1002 and operates on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to perform the radio communication method according to the present embodiment.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via wired and/or radio networks, and will be also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above-described transmission/reception antennas 101 (201), amplifying sections 102 (202), transmitting/receiving sections 103 (203) and channel interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using different buses between apparatuses.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or all of each function block. For example, the processor 1001 may be implemented by using at least one of these types of hardware.

Modified Example

In addition, each term that has been described in this description and/or each term that is necessary to understand this description may be replaced with terms having identical or similar meanings. For example, a channel and/or a symbol may be signals (signalings). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of durations (frames) in a time domain. Each of one or a plurality of durations (frames) that composes a radio frame may be referred to as a subframe. Furthermore, the subframe may include one or a plurality of slots in the time domain. The subframe may be a fixed time duration (e.g., 1 ms) that does not depend on the numerologies.

Furthermore, the slot may include one or a plurality of symbols (Orthogonal Frequency Division Multiplexing (OFDM) symbols or Single Carrier-Frequency. Division Multiple Access (SC-FDMA) symbols) in the time domain. Furthermore, the slot may be a time unit based on the numerologies. Furthermore, the slot may include a plurality of mini slots. Each mini slot may include one or a plurality of symbols in the time domain. Furthermore, the mini slot may be referred to as a subslot.

The radio frame, the subframe, the slot, the mini slot and the symbol each indicate a time unit for conveying signals. The other corresponding names may be used for the radio frame, the subframe, the slot, the mini slot and the symbol. For example, 1 subframe may be referred to as a Transmission Time Interval (TTI), a plurality of contiguous subframes may be referred to as TTIs, or 1 slot or 1 mini slot may be referred to as a TTI. That is, the subframe and/or the TTI may be a subframe (1 ms) according to legacy UTE, may be a duration (e.g., 1 to 13 symbols) shorter than 1 ms or may be a duration longer than 1 ms. In addition, a unit that indicates the TTI may be referred to as a slot or a mini slot instead of a subframe.

In this regard, the TTI refers to, for example, a minimum time unit of scheduling for radio communication. For example, in the LTE system, the radio base station performs scheduling for allocating radio resources (a frequency bandwidth or transmission power that can be used in each user terminal) in TTI units to each user terminal. In this regard, a definition of the TTI is not limited to this.

The TTI may be a transmission time unit of a channel-coded data packet (transport block), code block and/or codeword, or may be a processing unit of scheduling or link adaptation. In addition, when the TTI is given, a time period (e.g., the number of symbols) in which a transport block, a code block and/or a codeword are actually mapped may be shorter than the TTI.

In addition, when 1 slot or 1 mini slot is referred to as a TTI, 1 or more TTIs (i.e., 1 or more slots or 1 or more mini slots) may be a minimum time unit of scheduling. Furthermore, the number of slots (the number of mini slots) that compose a minimum time unit of the scheduling may be controlled.

The TTI having the time duration of 1 ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe, a short subframe, a mini slot or a subslot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

A Resource Block (RB) is a resource allocation unit of the time domain and the frequency domain, and may include one or a plurality of contiguous subcarriers in the frequency domain. Furthermore, the RB may include one or a plurality of symbols in the time domain or may have the length of 1 slot, 1 mini slot, 1 subframe or 1 TTI. 1 TTI or 1 subframe may each include one or a plurality of resource blocks. In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may include one or a plurality of Resource Elements (REs). For example, 1 RE may be a radio resource domain of 1 subcarrier and 1 symbol.

In this regard, structures of the above-described radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and parameters described in this description may be expressed by using absolute values, may be expressed by using relative values with respect to given values or may be expressed by using other corresponding information. For example, a radio resource may be instructed by a given index.

Names used for parameters in this description are in no respect restrictive names. For example, various channels (the Physical Uplink Control Channel (PUCCH) and the Physical Downlink Control Channel (PDCCH)) and information elements can be identified based on various suitable names. Therefore, various names assigned to these various channels and information elements are in no respect restrictive names.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by using a management table. The information and signals to be input and output can be overwritten, updated or additionally written. The output information and signals may be deleted. The input information and signals may be transmitted to other apparatuses.

Notification of information is not limited to the aspect/embodiment described in this description and may be performed by using other methods. For example, the information may be notified by a physical layer signaling (e.g., Downlink Control Information (DCI) and Uplink Control Information (UCI)), a higher layer signaling (e.g., a Radio Resource Control (RRC) signaling, broadcast information (a Master Information Block (MIB) and a System Information Block (SIB)), and a Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") is not limited to explicit notification, and may be given implicitly (by, for example, not giving notification of the given information or by giving notification of another information).

Decision may be made based on a value (0 or 1) expressed as 1 bit, may be made based on a Boolean expressed as true or false or may be made by comparing numerical values (by, for example, making comparison with a given value).

Irrespectively of whether software is referred to as software, firmware, middleware, a microcode or a hardware description language or is referred to as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using wired techniques (e.g., coaxial cables, optical fiber cables, twisted pairs and Digital Subscriber Lines (DSLs)) and/or radio techniques (e.g., infrared rays and microwaves), these wired techniques and/or radio techniques are included in a definition of the transmission media.

The terms "system" and "network" used in this description are interchangeably used.

In this description, the terms "Base Station (BS)", "radio base station", "eNB", "gNB", "cell", "sector", "cell group", "carrier" and "component carrier" can be interchangeably used. The base station will be also referred to as a term such as a fixed station, a NodeB, an eNodeB (eNB), an access point, a transmission point, a reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can also provide a communication service via a base station subsystem (e.g., indoor small base station (RRH: Remote Radio Head)). The term "cell" or "sector" indicates part or the entirety of the coverage area of the base station and/or the base station subsystem that provide a communication service in this coverage.

In this description, the terms "Mobile Station (MS)", "user terminal", "user apparatus (UE: User Equipment)" and "terminal" can be interchangeably used.

The mobile station will be also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

Furthermore, the radio base station in this description may be read as the user terminal. For example, each aspect/embodiment of the present disclosure may be applied to a configuration where communication between the radio base station and the user terminal is replaced with communication between a plurality of user terminals (D2D: Device-to- Device). In this case, the user terminal 20 may be configured to include the functions of the above-described radio base station 10. Furthermore, words such as "uplink" and "downlink" may be read as a "side". For example, the uplink channel may be read as a side channel.

Similarly, the user terminal in this description may be read as the radio base station. In this case, the radio base station 10 may be configured to include the functions of the above-described user terminal 20.

In this description, operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MMEs) or Serving-Gateways (S-GWs) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" calculating, computing, processing, deriving, investigating, looking up (e.g., looking up in a table, a database or another data structure) and ascertaining. Furthermore, "deciding (determining)" may be regarded to "decide (determine)" receiving (e.g., receiving information), transmitting (e.g., transmitting information), input, output and accessing (e.g., accessing data in a memory). Furthermore, "deciding (determining)" may be regarded to "decide (determine)" resolving, selecting, choosing, establishing and comparing. That is, "deciding (determining)" may be regarded to "decide (determine)" some operation.

The words "connected" and "coupled" used in this description or every modification of these words can mean every direct or indirect connection or coupling between 2 or more elements, and can include that 1 or more intermediate elements exist between the two elements "connected" or "coupled" with each other. The elements may be coupled or connected physically or logically or by a combination of these physical and logical connections. For example, "connection" may be read as "access".

It can be understood in this description that, when connected, the two elements are "connected" or "coupled" with each other by using 1 or more electric wires, cables and/or printed electrical connection, and by using electromagnetic energy having wavelengths in radio frequency domains, microwave domains and/or (both of visible and invisible) light domains in some non-restrictive and non-comprehensive examples.

A sentence that "A and B are different" in this description may mean that "A and B are different from each other". Words such as "separate" and "coupled" may be also interpreted in a similar manner.

When the words "including" and "comprising" and modifications of these words are used in this description or the claims, these words intend to be comprehensive similar to the word "having". Furthermore, the word "or" used in this description or the claims intends not to be an exclusive OR.

The invention according to the present disclosure has been described in detail above. However, it is obvious for a person skilled in the art that the invention according to the present disclosure is not limited to the embodiment described in this description. The invention according to the present disclosure can be carried out as modified and changed aspects without departing from the gist and the scope of the invention defined based on the recitation of the claims. Accordingly, the disclosure of this description is intended for exemplary explanation, and does not bring any restrictive meaning to the invention according to the present disclosure.

The invention claimed is:

1. A terminal comprising:
 a receiver that receives information from a base station; and
 a processor that, for cells of a same frequency in a time division duplex (TDD) frequency band, determines system frame number alignment and frame timing alignment across the cells of the same frequency in the TDD frequency band and, for cells of a same frequency in a frequency division duplex (FDD) frequency band, when the information is set to true by the base station, determines system frame number alignment and frame timing alignment across the cells of the same frequency in the FDD frequency band,
 wherein the frame timing alignment comprises half-frame timing alignment, and
 wherein the information indicates that a synchronization signal block index can be derived.

2. The terminal according to claim 1, wherein the receiver receives the information in measurement notification.

3. The terminal according to claim 1, wherein the receiver receives the information in cell re-selection notification.

4. The terminal according to claim 1, wherein the receiver receives the information in handover notification.

5. A radio communication method for a terminal, comprising:

receiving information from a base station; and for cells of a same frequency in a time division duplex (TDD) frequency band, determining system frame number alignment and frame timing alignment across the cells of the same frequency in the TDD frequency band and, for cells of a same frequency in a frequency division duplex (FDD) frequency band, when the information is set to true by the base station, determining system frame number alignment and frame timing alignment across the cells of the same frequency in the FDD frequency band, wherein the frame timing alignment comprises half-frame timing alignment, and wherein the information indicates that a synchronization signal block index can be derived.

6. The terminal according to claim 1, wherein the receiver receives the information by using Radio Resource Control (RRC) signaling.

7. A system comprising:
a base station; and
a terminal, wherein the base station comprises:
a transmitter that transmits information; and wherein the terminal comprises:
a receiver that receives the information from the base station; and
a processor that, for cells of a same frequency in a time division duplex (TDD) frequency band, determines system frame number alignment and frame timing alignment across the cells of the same frequency in the TDD frequency band and, for cells of a same frequency in a frequency division duplex (FDD) frequency band, when the information is set to true by the base station, determines system frame number alignment and frame timing alignment across the cells of the same frequency in the FDD frequency band, wherein the frame timing alignment comprises half-timing alignment, and wherein the information indicates that a synchronization signal block index can be derived.

* * * * *